United States Patent
Callau et al.

(10) Patent No.: US 9,852,221 B1
(45) Date of Patent: Dec. 26, 2017

(54) DISTRIBUTED STATE MANAGER JURY SELECTION

(71) Applicant: Amazon Technologies, Inc., Seattle, WA (US)

(72) Inventors: Carlos Vara Callau, Seattle, WA (US); Allan Henry Vermeulen, Corvallis, OR (US); Christopher Richard Jacques De Kadt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 337 days.

(21) Appl. No.: 14/670,238

(22) Filed: Mar. 26, 2015

(51) Int. Cl.
*G06F 17/30* (2006.01)
*H04L 29/08* (2006.01)

(52) U.S. Cl.
CPC .... *G06F 17/30864* (2013.01); *G06F 17/3053* (2013.01); *G06F 17/30545* (2013.01); *H04L 67/10* (2013.01)

(58) Field of Classification Search
CPC ......... G06F 17/30864; G06F 17/30545; G06F 17/3053; H04L 67/10
USPC ...................................................... 707/723
See application file for complete search history.

(56) References Cited

U.S. PATENT DOCUMENTS

| | | | |
|---|---|---|---|
| 4,665,520 A | 5/1987 | Strom et al. | |
| 4,928,222 A | 5/1990 | Vriezen et al. | |
| 5,212,788 A | 5/1993 | Lomet et al. | |
| 5,261,085 A | 11/1993 | Lamport | |
| 5,261,106 A | 11/1993 | Lentz et al. | |
| 5,301,309 A | 4/1994 | Sugano | |
| 5,522,029 A | 5/1996 | Hatfield | |
| 5,553,239 A | 9/1996 | Heath et al. | |
| 5,666,486 A * | 9/1997 | Alfieri | G06F 9/5061 700/2 |
| 5,724,508 A * | 3/1998 | Harple, Jr. | G06Q 10/10 348/E7.084 |
| 5,802,267 A | 9/1998 | Shirakihara et al. | |
| 5,828,876 A | 10/1998 | Fish et al. | |
| 5,845,292 A | 12/1998 | Bohannon et al. | |
| 5,923,832 A | 7/1999 | Shirakihara et al. | |
| 5,988,847 A | 11/1999 | McLaughlin et al. | |
| 6,078,930 A | 6/2000 | Lee et al. | |
| 6,105,148 A | 8/2000 | Chung et al. | |
| 6,169,991 B1 | 1/2001 | Tsukahara | |

(Continued)

OTHER PUBLICATIONS

"Future (Java 2 Platform SE 5.0)," 2004/2010 Oracle and/or its Affiliates, downloaded from docs.oracle.com/javase/1.5.0/docs/api/java/util/concurrent/Future.html, pp. 1-4.

(Continued)

*Primary Examiner* — Phuong Thao Cao
(74) *Attorney, Agent, or Firm* — Robert C. Kowert; Meyertons, Hood, Kivlin, Kowert & Goetzel, P.C.

(57) ABSTRACT

A jury candidate server (JCS) of a distributed state manager (DSM) implements a plurality of jury configuration evaluation iterations. In a particular iteration, the JCS generates one or more jury configuration options (JCOs) representing changes to a current jury, and assigns quality metrics to the JCOs based at least in part on a prioritized set of criteria among which location diversity has the highest priority. If a JCO meets a quality threshold, a corresponding jury transition is proposed for approval by the current jury.

21 Claims, 11 Drawing Sheets

(56) References Cited

U.S. PATENT DOCUMENTS

| | | | |
|---|---|---|---|
| 6,173,293 B1 | 1/2001 | Thekkath et al. | |
| 6,332,200 B1 | 12/2001 | Meth et al. | |
| 6,374,243 B1 | 4/2002 | Kobayashi et al. | |
| 6,516,350 B1 | 2/2003 | Lumelsky et al. | |
| 6,529,933 B1 | 3/2003 | Montgomery et al. | |
| 6,847,993 B1* | 1/2005 | Novaes | G06F 9/5061 370/216 |
| 7,024,483 B2* | 4/2006 | Dinker | H04L 41/12 709/204 |
| 7,035,858 B2* | 4/2006 | Dinker | G06F 17/30575 |
| 7,139,925 B2* | 11/2006 | Dinker | H04L 41/12 370/242 |
| 7,152,124 B1 | 12/2006 | Puri et al. | |
| 7,249,280 B2 | 7/2007 | Lamport et al. | |
| 7,426,653 B2 | 9/2008 | Hu et al. | |
| 7,577,690 B2 | 8/2009 | Chandrasekaran et al. | |
| 7,603,357 B1 | 10/2009 | Gourdol et al. | |
| 7,624,047 B1 | 11/2009 | Round | |
| 7,773,522 B2 | 8/2010 | Chafle et al. | |
| 7,783,610 B2 | 8/2010 | Lin et al. | |
| 7,792,980 B2 | 9/2010 | Eshel et al. | |
| 7,925,782 B2 | 4/2011 | Sivasubramanian et al. | |
| 7,937,616 B2 | 5/2011 | Armstrong et al. | |
| 7,984,043 B1* | 7/2011 | Waas | G06F 17/30932 707/718 |
| 7,984,439 B2 | 7/2011 | McConnell | |
| 8,006,124 B2 | 8/2011 | Park et al. | |
| 8,037,186 B2 | 10/2011 | Dumitriu et al. | |
| 8,042,102 B2 | 10/2011 | Dewitt, Jr. et al. | |
| 8,046,763 B1 | 10/2011 | Czajkowski et al. | |
| 8,073,941 B2 | 12/2011 | Binyamin | |
| 8,090,717 B1* | 1/2012 | Bharat | G06F 17/30675 707/731 |
| 8,108,712 B1 | 1/2012 | Carlino et al. | |
| 8,108,733 B2 | 1/2012 | Richmond | |
| 8,122,098 B1 | 2/2012 | Richardson et al. | |
| 8,244,939 B2 | 8/2012 | Wewel | |
| 8,271,437 B2 | 9/2012 | Arcese et al. | |
| 8,321,568 B2 | 11/2012 | Sivasubramanian et al. | |
| 8,458,517 B1* | 6/2013 | Vermeulen | G06F 11/1458 709/201 |
| 8,654,650 B1 | 2/2014 | Vermeulen et al. | |
| 8,694,639 B1* | 4/2014 | Vermeulen | G06F 9/5011 709/226 |
| 8,719,432 B1* | 5/2014 | Vermeulen | G06F 9/526 707/704 |
| 9,578,130 B1* | 2/2017 | Nguyen | H04L 67/32 |
| 2001/0033555 A1 | 10/2001 | Kim et al. | |
| 2002/0049845 A1* | 4/2002 | Sreenivasan | H04L 69/40 709/226 |
| 2003/0088659 A1* | 5/2003 | Susarla | H04L 29/06 709/223 |
| 2003/0187927 A1* | 10/2003 | Winchell | G06F 11/1492 709/204 |
| 2003/0200194 A1 | 10/2003 | Arnold et al. | |
| 2003/0204509 A1* | 10/2003 | Dinker | G06F 17/30575 |
| 2003/0204786 A1* | 10/2003 | Dinker | H04L 41/12 714/43 |
| 2004/0049573 A1* | 3/2004 | Olmstead | G06F 11/2028 709/224 |
| 2004/0205048 A1 | 10/2004 | Pizzo et al. | |
| 2004/0255048 A1 | 12/2004 | Lev Ran et al. | |
| 2005/0028160 A1 | 2/2005 | Cofer et al. | |
| 2005/0055384 A1 | 3/2005 | Ganesh et al. | |
| 2005/0289143 A1 | 12/2005 | Oshri et al. | |
| 2006/0064554 A1 | 3/2006 | Fridella et al. | |
| 2006/0114847 A1* | 6/2006 | Dssouli | H04M 3/56 370/261 |
| 2006/0136781 A1 | 6/2006 | Lamport | |
| 2006/0179059 A1 | 8/2006 | Reed et al. | |
| 2006/0235889 A1* | 10/2006 | Rousseau | G06F 17/30578 |
| 2007/0050392 A1 | 3/2007 | Shukla et al. | |
| 2007/0109979 A1* | 5/2007 | Fu | H04L 12/1813 370/261 |
| 2007/0174541 A1 | 7/2007 | Chandrasekaran et al. | |
| 2008/0126647 A1 | 5/2008 | Cometto et al. | |
| 2008/0177830 A1 | 7/2008 | Vo et al. | |
| 2008/0208938 A1 | 8/2008 | Lin et al. | |
| 2008/0222321 A1 | 9/2008 | Hart et al. | |
| 2009/0177914 A1 | 7/2009 | Winchell | |
| 2009/0287720 A1 | 11/2009 | Herter et al. | |
| 2009/0327292 A1 | 12/2009 | Janssen et al. | |
| 2009/0327807 A1 | 12/2009 | Varadarajan et al. | |
| 2010/0023521 A1 | 1/2010 | Arcese et al. | |
| 2010/0036831 A1 | 2/2010 | Vemuri et al. | |
| 2010/0161573 A1 | 6/2010 | Chan et al. | |
| 2010/0180146 A1 | 7/2010 | Rousseau et al. | |
| 2011/0106778 A1 | 5/2011 | Chan et al. | |
| 2011/0161791 A1 | 6/2011 | Travis et al. | |
| 2011/0228668 A1* | 9/2011 | Pillai | G06F 11/2023 370/217 |
| 2012/0106925 A1* | 5/2012 | Dirik | H04N 5/147 386/240 |
| 2012/0271795 A1 | 10/2012 | Rao et al. | |
| 2012/0290706 A1* | 11/2012 | Lin | G06F 8/60 709/224 |
| 2013/0080559 A1* | 3/2013 | Rao | H04L 67/1097 709/208 |
| 2014/0108415 A1* | 4/2014 | Bulkowski | G06F 17/30545 707/741 |
| 2014/0280452 A1* | 9/2014 | Aahlad | H04L 67/1095 709/202 |
| 2015/0019562 A1* | 1/2015 | Bulkowski | G06F 17/30545 707/741 |
| 2016/0070740 A1* | 3/2016 | Vermeulen | G06F 17/30545 707/703 |
| 2016/0191611 A1* | 6/2016 | Srinivasan | H04L 67/10 709/201 |

OTHER PUBLICATIONS

U.S. Appl. No. 13/528,271, filed Jun. 20, 2012, Long X. Nguyen.
U.S. Appl. No. 13/528,249, filed Jun. 20, 2012, Long X. Nguyen, et al.
U.S. Appl. No. 13/528,340, filed Jun. 20, 2012, Long X. Nguyen.
U.S. Appl. No. 12/771,840, filed Apr. 30, 2010, Allan H. Vermeulen, et al.
U.S. Appl. No. 12/887,042, filed Sep. 21, 2010, Allan H. Vermeulen, et al.
U.S. Appl. No. 12/771,851, filed Apr. 30, 2010, Allan H. Vermeulen, et al.
"Restoring Consistent Global States of Distributed Computations," Goldberg, et al., 1991 ACM, pp. 1-11.
"The Chubby lock service for loosely-coupled distributed systems," Mike Burrows, Google, Inc., pp. 335-350 Year of Publication: 2006, ISBN:1-931971-47-1.
"Transparent Checkpoint-Restart of Distributed Applications on Commodity Clusters," Laaden, et al., Appears in Proceedings of the 2005 IEEE International Conference on Cluster Computing (Cluster 2005), Boston, MA, Sep. 26-30, 2005.
"Distributed Checkpointing: Analysis and Benchmarks," Gustavo M. D. Vieira and Luiz E. Buzato, Partially supported by CAPES under grant No. 01P-15081/1997, pp. 1-16.
Chandra, et al.,"Paxos Made Live—An Engineering Perspective," Jun. 20, 2007, pp. 1-16.
"Paxos Made Simple," Leslie Lamport, Nov. 1, 2001., pp. 1-14.
Oracle. "Oracle Database: Advanced Application Developer's Guide, 11 g Release 1 (11.1 )". Aug. 2008. 520 pages.
Andrew Witkowski, et al., "Continuous Queries in Oracle". In "Proceedings of the 33rd international conference on Very large data bases." pp. 1173-1184. Sep. 23, 2007.
Oracle. "Oracle Call Interface: Programmer's Guide, 11 g Release 1 (11.1 )". Oct. 2008. 1310 pages.
U.S. Appl. No. 13/528,301, filed Jun. 20, 2012, Long X. Nguyen, et al.
U.S. Appl. No. 13/625,506, filed Sep. 24, 2012, Nirmal Mehta, et al.

(56) References Cited

OTHER PUBLICATIONS

U.S. Appl. No. 13/770,569, filed Feb. 19, 2013, Bryan James Donlan.

* cited by examiner

| Jury configuration quality score/ranking criterion 502 | Example priority/weight 504 |
|---|---|
| Location diversity 506 (e.g., number of distinct availability containers, data centers, data center rooms, and/or racks among which jury members are distributed) | 10 (highest priority) |
| Server availability status 508 (e.g., whether various jury members are active (responsive to network messages in a timely fashion) or not ) | 6 |
| Physical infrastructure component independence 510 (e.g., do several jury members rely on the same electrical/cooling components or not) | 4 |
| Server performance/utilization metrics 512 | 3 |
| Execution platform diversity 514 (e.g., number of distinct hardware vendors, server models, CPU types, Oss used for jury members) | 2 |

Table 500

*FIG. 5*

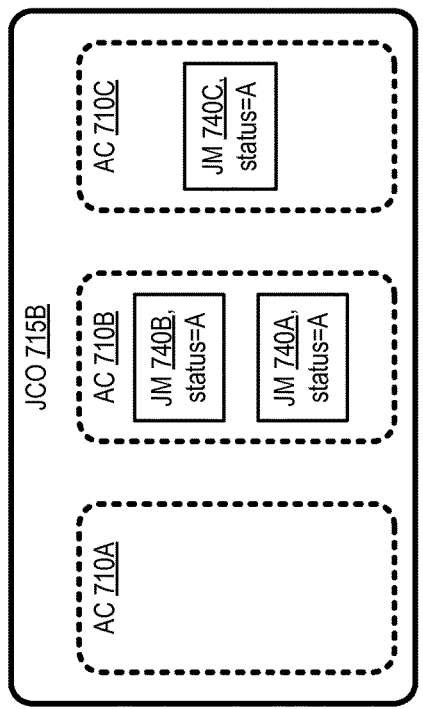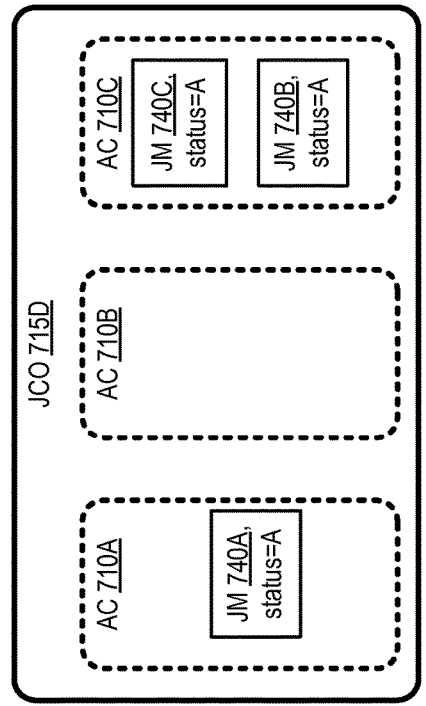
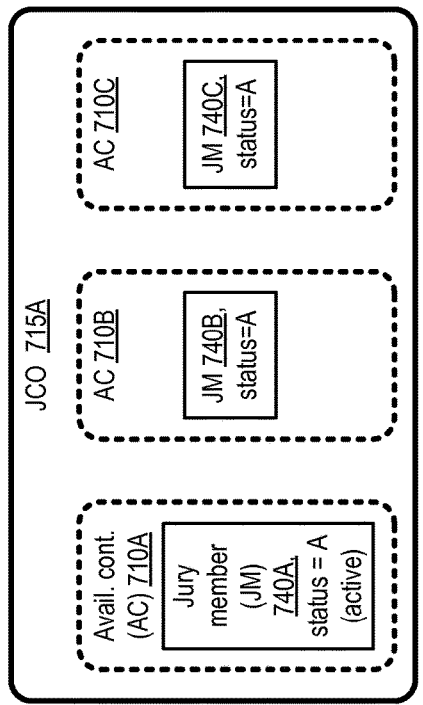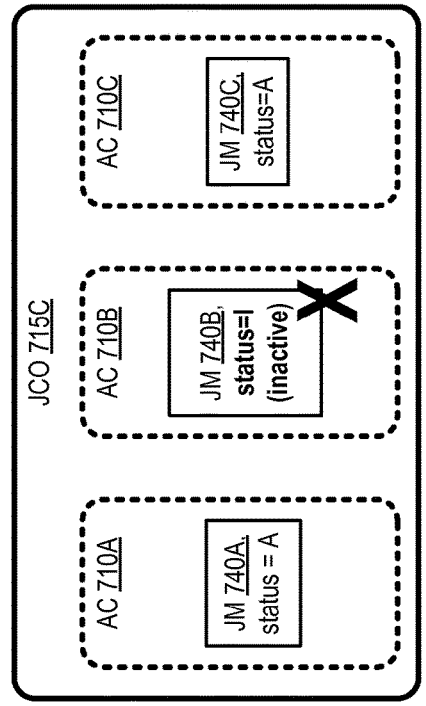
FIG. 7a
FIG. 7b

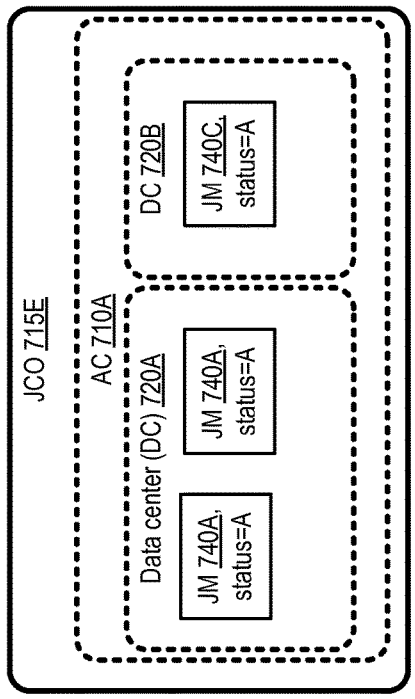
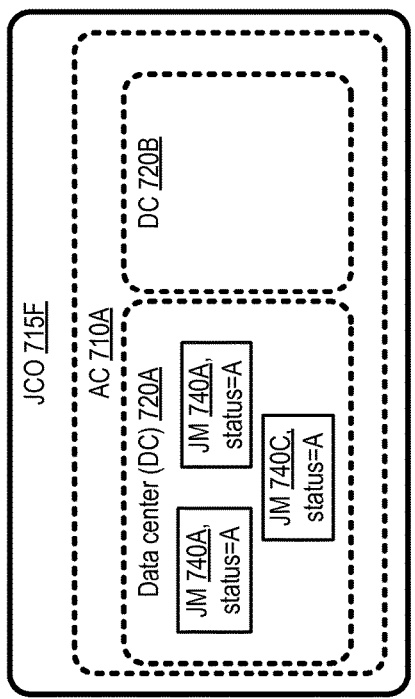
CQS(715E) > CQS(715F)
Configuration quality score comparison result
FIG. 7c
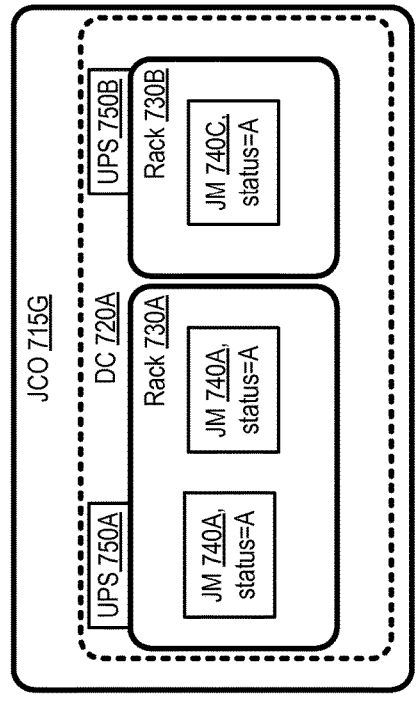
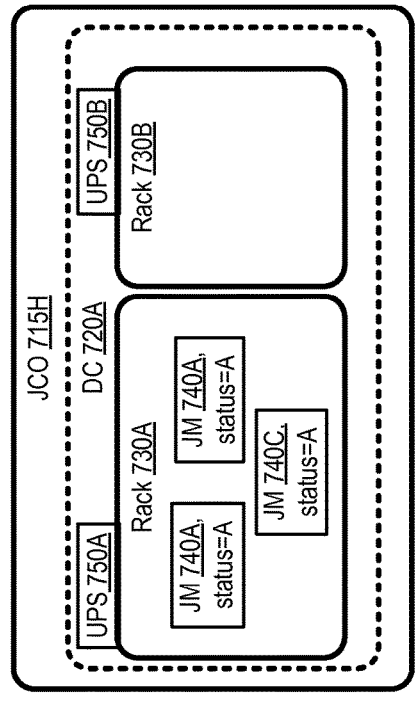
CQS(715G) > CQS(715H)
Configuration quality score comparison result
FIG. 7d

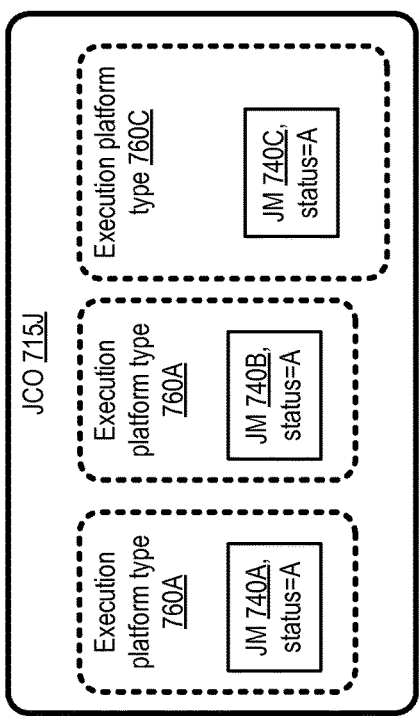
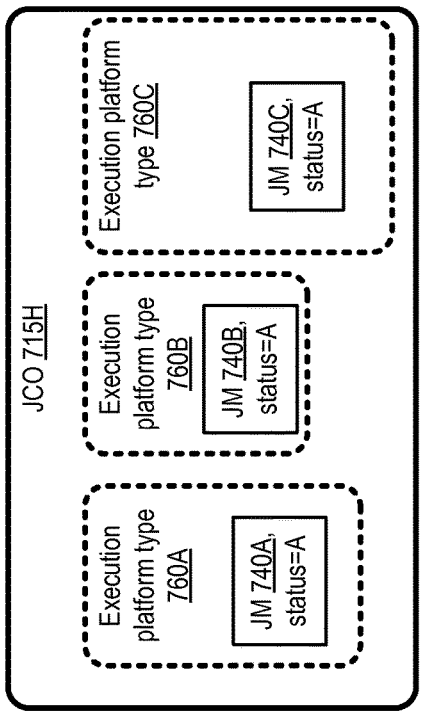
FIG. 7e
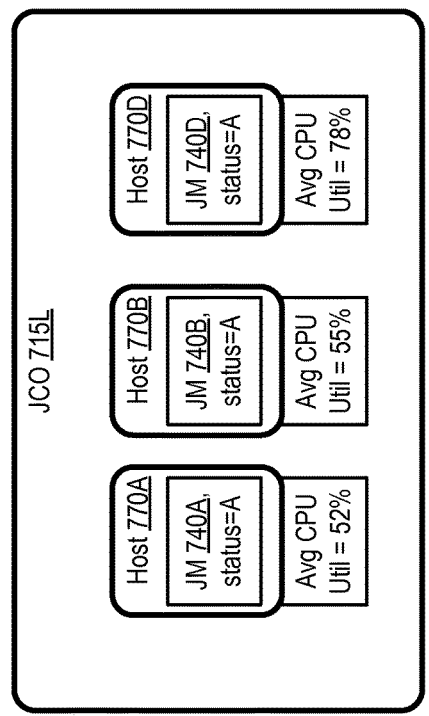
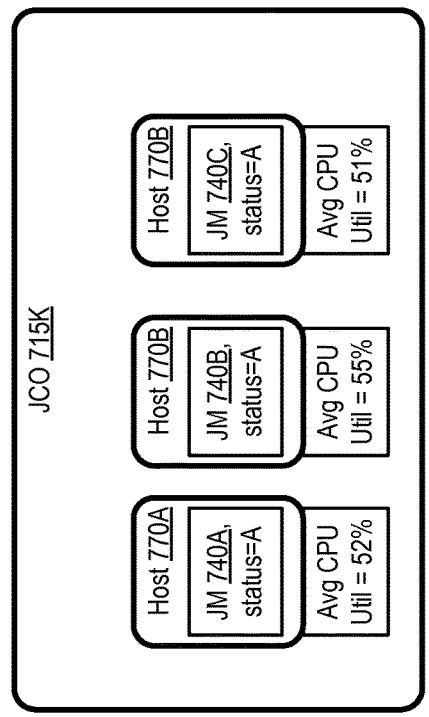
FIG. 7f

DISTRIBUTED STATE MANAGER JURY SELECTION

BACKGROUND

Implementing computing systems that manage large quantities of data and/or service large numbers of users often presents problems of scale. As demand for various types of computing services grows, it may become difficult to service that demand without increasing the available computing resources accordingly. To facilitate scaling in order to meet demand, many computing-related services are implemented as distributed applications, each application being executed on a number of computer hardware servers. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data to which access is normally coordinated using some type of concurrency control mechanism). The larger the distributed system, the more difficult it may be to coordinate the actions of various actors within the system (e.g., owing to the difficulty of ensuring that many different actors that are potentially widely distributed have a consistent view of system state). For some distributed applications, a state management mechanism that is itself distributed may be set up to facilitate such coordination. Such a state management mechanism, which may be referred to as a distributed state manager (DSM), may comprise a number of physically distributed servers. The managed distributed application may submit requests for state transitions to the DSM, and in some implementations decisions as to whether to commit or reject the submitted transitions may be made by a group of servers of the DSM referred to as a "jury". Representations of committed state transitions may be replicated at multiple nodes of the DSM in some implementations, e.g., to increase the availability and/or durability of state information of the managed applications.

Of course, as in any distributed system, the servers of a DSM may themselves fail under various conditions. In an environment in which communication latencies between DSM servers may vary substantially, which may be the case depending on the nature of the connectivity between the servers, determining whether the DSM itself is in a healthy state (e.g., with a sufficient number of jurors to make state transition decisions) may not be straightforward. In at least some DSM implementations, jury members may be selected dynamically in an automated and distributed fashion by the DSM servers themselves, with each server involved in the jury selection process acting on the basis of potentially out-of-date information, and each proposed change to the jury requiring approval by the current jury before the change is committed. In such environments, selecting and implementing jury membership changes to improve the overall availability and failure resilience of the DSM may be a non-trivial exercise.

BRIEF DESCRIPTION OF DRAWINGS

FIG. 5 illustrates examples of prioritized criteria that may be used to determine the relative quality rankings of alternative jury configurations, according to at least some embodiments.

FIG. 7a-7f illustrate respective examples of jury configuration differences and corresponding relative quality rankings, according to at least some embodiments.

Figure 1:
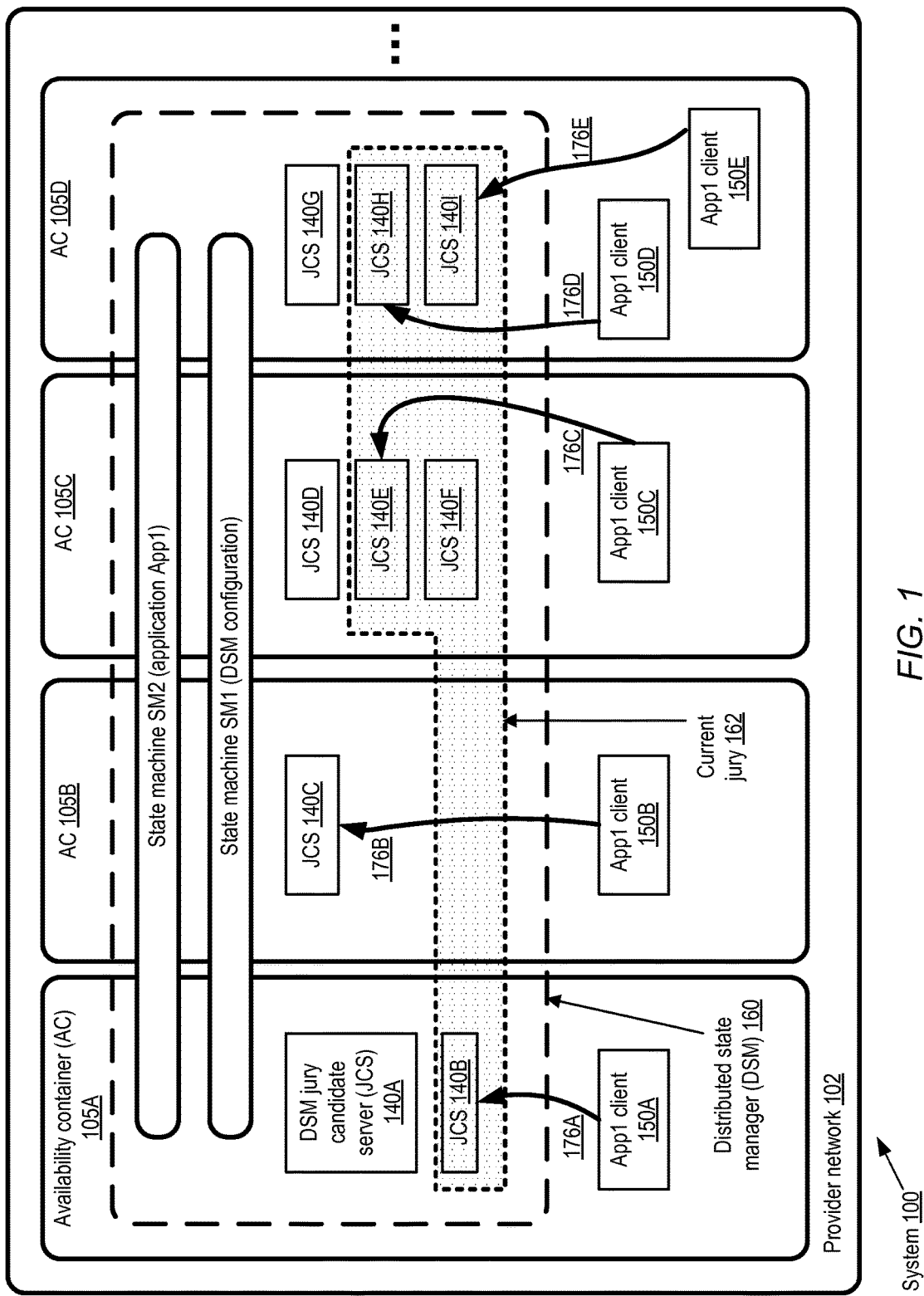
FIG. 1 illustrates an example system environment in which members of a jury, comprising a subset of servers of a distributed state manager (DSM), may be selected using a multi-criterion distributed algorithm in which location diversity of the jury is prioritized, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for selecting juror servers responsible for approving state transitions at a distributed state manager (DSM) are described. DSMs may be established to manage persistent state information of a variety of distributed applications, including, for example, internal applications used to implement various services in a provider network or cloud environment, and/or applications implementing client business logic. The distributed applications may comprise multiple concurrent and often autonomous processes, communicating with one another and/or with shared resources across one or more networks. Various application processes may be executing on different physical and/or logical (e.g., virtual) resources or platforms at any given time, and the number of resources involved in the application or service may change over time. In a distributed storage service, for example, processes (e.g., software servers) on different machines may each expose a programmatic interface to clients, which the clients may use to access a single, virtual file system that may be implemented across multiple storage resources. In order for the concurrent processes of a distributed application to cooperate successfully, it may sometimes be necessary for one or more of the processes to gain exclusive access to a given shared resource for a given period of execution. A DSM may be used to manage accesses to such shared resources in some embodiments.

In one embodiment, such a shared resource may include, for example, administrative/configuration information or data state information of the distributed application. To facilitate consistent sharing of administrative and/or data state among the multiple concurrent processes, a DSM may implement a repository or registry in which various types of state information of the distributed application may be stored. Each of the constituent processes of the distributed application may be deemed a client process of the DSM. The term "client" may be used synonymously with the terms "client process" and "client node" herein. Each client process may interact with the DSM to update various elements of the state information, and to coordinate access to state information shared with other client processes. In various embodiments, the repository may contain several types of elements, such as lockable data entries (i.e., software objects containing data values representing shared state information), session objects representing currently active interactions between the client processes and the DSM, locks and the like. To perform various access operations (e.g., reads, writes) to shared resources such as data entries and/or session elements of the registry, a client process may first acquire the shared resource's respective lock in some embodiments.

A DSM may provide various benefits over a non-distributed state manager, such as higher availability and/or throughput. For example, a DSM implemented on a cluster of computer servers (which may also be referred to herein as "nodes" of the DSM) may allow a client process to interact with any of a plurality of the servers in order to acquire and/or release locks. Thus, the DSM may be more resilient in case of a hardware and/or software malfunction. Additionally, a DSM may facilitate higher throughput of lock acquisition/release operations by utilizing collective resources from multiple machines. In addition to locking-related functions, a DSM may also provide a number of other types of functions in some embodiments, such as, for example, replicating state information for higher durability, monitoring client application nodes, state information cache enablement, data transfers or replication, and the like. A number of different types of computing devices may be used singly or in combination to implement a DSM in different embodiments, including general purpose or special purpose computer servers, storage devices, networking devices and the like. The repository in which state information is stored may be implemented using a number of different techniques in various embodiments, including for example as a logical or virtual object managed collectively by the nodes of the DSM. The set of nodes of a DSM may be referred to as a "collective" in some implementations.

In at least some embodiments, as mentioned earlier, a DSM may be used to manage one or more services of a provider network, and may itself be implemented using the resources of a provider network. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks herein. A given provider network may include numerous data centers hosting various resource pools, such as collections of physical and/or virtualized computer servers, storage devices, networking equipment and the like, needed to implement, configure and distribute the infrastructure and services offered by the provider. At least some provider networks and the corresponding network-accessible services may be referred to as "public clouds" and "public cloud services" respectively. Within large provider networks, some data centers may be located in different cities, states or countries than others, and in some embodiments the resources allocated to a given service (such as a storage service or computing service whose state is managed using a DSM) may be distributed among several such locations to achieve desired levels of availability, fault-resilience and performance. Similarly, the servers of the DSM may also be distributed among various locations in at least some embodiments.

During normal operation, the servers of a DSM may use various protocols (such as consensus-based protocols or quorum-based protocols in which a plurality of servers collectively make decisions) to ensure that updates to state information from various client processes are managed appropriately. The set of DSM nodes that are configured to approve state transitions (which may also be described herein as write-containing transactions) may be termed a "jury" in some embodiments. For example, in one implementation, a particular DSM may comprise nine servers (e.g., nine processes instantiated at respective hosts), with five of the servers typically designated as jurors at any given time during normal operation with respect to a given distributed application being managed by the DSM. Changes to the membership of the jury may also be initiated and approved by the DSM servers (including the current jury members) in at least some embodiments. For example, when one DSM server detects an apparent failure of a particular jury member, that DSM server may propose a replacement member, and the proposed change may have to be approved by a majority of the current jury to be committed. Thus, the DSM may implement at least two types of state machines in some embodiments: state machines representing client applications, and at least one state machine representing the DSM membership (including jury membership). Unless a majority of the jury (e.g., at least three of the five jurors in the current example) agrees to commit any given transition to either type of state machine, the transition may be rejected in at least some embodiments. Representations of committed state changes may be replicated at some number of storage devices (e.g., a respective storage device at some subset or all of the DSM servers) to ensure durability of state information in various embodiments.

The DSM servers which are capable of acting as jurors may be termed jury candidate servers (JCSs) herein. In some embodiments, all the servers of DSM may be designated as JCSs, while in other embodiments, only a subset of the DSM servers may have the appropriate functionality of capability (e.g., a required performance capacity, networking capacity, or software functionality) to act as jurors. To simplify the presentation, all DSM servers are assumed to be JCSs in much of the following description. It is noted, however, that the techniques for managing jury membership changes described herein may be implemented equally effectively in environments in which only a strict subset of DSM servers are capable of being designated as jurors.

At any given point in time, at least a subset of the JCSs may be designated as current members of the jury (e.g., in an embodiment in which a DCM has nine JCSs, five of the nine JCSs may be assigned a juror role). In some embodiments, each JCS may maintain a local cache of information regarding the current configuration of the jury, the current availability status of all the JCSs, as well as additional types of metadata that may at least in principle be useful in identifying potentially beneficial jury membership changes. In an embodiment in which each DSM is implemented at a separate computer host (e.g., as a respective set of processes or threads of execution), for example, the cache may comprise some portion of a local storage device and/or local main memory. Records indicative of state transitions that have been approved by the current jury may be stored in the local cache in some embodiments, for example, together with results of responsiveness tests directed at other JCSs, performance metrics that may have been collected locally and from other JCSs, and so on. Of course, because of the possibility of communication delays and/or lost messages, the local cache may not always have the most up-to-date information—e.g., at a given point in time, some JCSs of a DSM may have more recent and/or more accurate information in their local caches than others.

In order to provide the desired level of availability, performance and data durability for various distributed client applications, the servers of a DSM, and in particular the DSM jury, may often be physically distributed. A provider network at which a DSM is implemented may be organized into a plurality of geographical regions in various embodiments, and each region may include one or more availability containers, which may also be termed "availability zones" herein. An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services and/or applications, including the DSM, may therefore be protected from failures at a single location by launching respective sets of servers or processes in respective availability containers. In some embodiments, within a given availability container, at least slightly different levels of failure resilience may be achieved based on the distribution of DSM servers among different data centers, different rooms within a given data center, or even different racks within a given room. Generally speaking, as the intersection between the sets of resources on which different logical components of a distributed system such as a DSM jury rely is reduced, the failure resilience of the distributed system is expected to increase.

In at least some embodiments, a distributed algorithm that takes a number of factors into account may be utilized for DSM jury membership management. The algorithm may be run iteratively and autonomously at some or all of the JCSs of the DSM in various embodiments, including those JCSs which are currently jurors as well as those JCSs which are currently not members of the jury. For example, in one implementation, a respective iteration of the algorithm may be initiated at each JCS once every N seconds or once every K milliseconds. Each iteration may also be referred to herein as a respective "configuration evaluation iteration" (CEI). In each iteration, a given JCS may determine its current (typically accurate, but potentially out-of-date) views, using its local cache, of the current jury membership and the current availability status (e.g., active vs. inactive) of all the JCSs of the DSM. To obtain the availability status, for example, in one embodiment each JCS may transmit heartbeat messages to each other JCS, and classify a peer JCS as "inactive" if a timely response is not received for any of some number of successive heartbeat messages, and to classify the peer JCS as "active" otherwise. In one such scenario, if heartbeat messages are sent every 100 milliseconds from a given JCS (JCS-a) to a different JCS (JCS-b), and no responses are received to three consecutive heartbeat messages within one second, the destination JCS (JCS-b) may be designated as inactive. In other embodiments, instead of sending its own heartbeat messages, a separate health monitoring system that informs each DSM server periodically regarding the availability status of other DSM servers may be used.

Using its views of the current jury membership, the availability status of the JCSs, and/or additional metadata as described below, in various embodiments a given JCS may attempt to generate a set of one or more jury configuration options (JCOs) during a given CEI. In one embodiment, each JCO may indicate at least one change to the current jury membership (based on the JCS's view of the current membership), such as for example, the addition of the given JCS to the jury, or the substitution of one jury member by JCS that is currently not a member. In some embodiments, as described below, the set of JCOs that a given JCS is permitted to consider during a CEI may be limited to changes in which that JCS is a participant—e.g., each permissible JCO may include a jury membership status change (joining the jury, or leaving the jury) of the JCS which is evaluating or proposing the JCO. In other embodiments, the JCS may be permitted to generate JCOs that do not require changing its own jury membership status.

In at least some embodiments, during a CEI, the JCS may assign respective configuration quality scores (CQSs) to (a) the current membership of the jury and (b) one or more of the JCOs. The CQSs may be assigned based on a prioritized set of criteria, including for example a location diversity criterion and/or an availability criterion. In some embodiments, other criteria such as server utilization level criteria, platform diversity criteria and the like may be used. Further details regarding the different types of criteria which may be employed in different embodiments are provided below. In accordance with a location diversity criterion, for example, a jury whose members are spread among three availability containers may be assigned a higher CQS than a jury whose members are spread among just two availability containers if the two configurations are identical in all other respects. Similarly, if two jury configurations differ only in the number of distinct data centers used, the configuration which uses more data centers may be assigned a higher CQS on the basis of location diversity. Location diversity may be assigned a higher priority or a higher weight in determining the CQS than any of the other criteria in at least some embodiments. This emphasis on location diversity may enable the DSM to avoid concentrating juries in one or a small number of locations, as such jury concentration could have severe negative consequences on client applications if location-wide failures or network partitions affecting such locations occur. In accordance with the availability criterion (which may be assigned a lower priority than location diversity in at least some embodiments), among two jury configurations that differ only in the number of active or responsive jury members, the configuration with the higher number of active jury members may be assigned a higher CQS. The particular functions or methodologies used for assigning the CQSs to the JCOs may vary from one implementation to another. In some embodiments, instead of assigning absolute numerical values as quality scores to the JCOs and the current jury configuration, a JCS may simply rank them relative to one another—that is, configuration quality ranks (CQRs) may be used instead of CQSs.

Based at least in part on the CQSs (or CQRs) assigned to the different JCOs and the current jury, the JCS may determine whether any change to the current jury should be proposed during the current iteration in various embodiments. For example, if a particular JCO has a CQS which exceeds the CQS of the current jury by some minimum threshold, that JCO may be selected for a proposed transition to the jury. A proposal for the transition or transitions corresponding to the particular JCO may be submitted to the current jury membership (e.g., to any one of the jury members included in the proposing JCS's local view of the current jury). In at least some embodiments, if the change or changes in the proposal are approved by a majority of the jury, the change or changes may be applied atomically. For example, if the proposal includes a removal of JCS-a and an addition of JCS-b to the jury, either both operations (the addition and removal) may be applied, or neither change may be applied. If the proposed transition is accepted, a local record of the new jury configuration may be stored by the proposer. The new jury may subsequently be used for handling transitions of the distributed application being managed at the DSM, such as write-containing transactions requested by various clients (as well as for subsequent iterations of jury selection).

Of course, it may be that case that none of the JCOs generated by the JCS in a given CEI has a superior (or sufficiently superior) quality score than the current jury, in which case no proposal for a jury transition may be submitted by the JCS in that CEI. Regardless of whether a proposal is submitted or not, in at least some embodiments the JCS may eventually initiate the next CEI, e.g., after a selected time interval and/or in response to a triggering condition such as a detection of a potential failure of a jury member.

In at least some embodiments, the higher priority assigned to location diversity may help the DSM respond to some types of cascading high-impact failure scenarios more effectively than if the highest priority was assigned to availability or other criteria. For example, consider a scenario in which the target jury member count is five, and the provider network in which the DSM is implemented contains three availability containers AC1, AC2 and AC3. In one acceptable state, jury members JM1 and JM2 may be configured in AC1, JM3 and JM4 in AC2, and JM5 in AC3. All jury members are initially assumed to be active. If AC2 suffers a large-scale failure or network connectivity lapse, such that JM3 and JM4 appear inactive, and availability rather than location diversity is used to assign replacement jury members, two new active jury members JM6 and JM7 may be assigned within AC3 in one scenario. If, however, AC3 then fails and AC2 comes back online, only two jury members JM1 and JM2 may be left, which may delay the processing of application transition requests being managed by the DSM (as well as other jury transitions). In contrast, in an alternative scenario in which location diversity (e.g., a higher number of availability containers in use for the jury) is prioritized above availability, after AC2 fails, one of AC2's original jury members (say JM3) may be retained in the jury, and an additional jury member JM6 may be added in AC3. In this scenario, the jury may then comprise JM1 (located in AC1, status active), JM2 (AC1, active), JM3 (AC2, inactive), JM5 (AC3, active) and JM6 (AC3, active). If AC3 fails and AC2 comes back online (i.e., JM3 becomes active), the jury would still have a majority of jurors (JM1, JM2 and JM3) capable of processing state application transitions.

Example System Environment

FIG. 1 illustrates an example system environment in which members of a jury, comprising a subset of servers of a distributed state manager (DSM), may be selected using a multi-criterion distributed algorithm in which location diversity of the jury is prioritized, according to at least some embodiments. As shown, system 100 includes a provider network 102 whose resources are spread among at least four availability containers (ACs) 105A, 105B, 105C and 105D. As mentioned earlier, each availability container may in turn include physical and/or logical resources located at one or more data centers (although at least in some cases, a given data center may include resources belonging to more than one availability container). The availability containers may be designed and implemented to restrict the impact of failures (as far as possible) to within a single availability container, so that in most cases the effects of any given failure do not cascade across availability container boundaries. Separate sets of physical infrastructure components, such as electrical power sources, cooling systems, and the like may be used for the respective availability containers in at least some embodiments, for example. The provider network 102 may implement a variety of distributed network-accessible services, such as for example a virtual computing service, one or more storage services and the like. In addition, clients of the various services may also implement numerous distributed applications on top of the core services. In order to manage such distributed applications and services, one or more distributed state managers (DSMs) such as DSM 160 may be established in various embodiments.

DSM 160 may comprise a plurality of servers (e.g., respective processes or threads of execution running at respective hosts) distributed among the availability containers 105 in the depicted embodiment. At least a subset of the DSM servers may constitute a jury responsible for approving state transitions (e.g., using a majority vote) of the application(s) being managed, as well as for approving state transitions of the DSM itself. Various characteristics of the configuration of DSM 160 may change over time, such as the number of servers in the DSM, the mappings between the DSM servers and availability containers, and/or the subset of servers that are currently designated as jurors. The DSM 160 may collectively implement a respective state machine SM1 representing the changes to the DSM configuration, as well as one or more state machines representing the applications being managed (such as state machine SM2 for an application App1). Each of the servers of the DSM may be configured to handle application requests (e.g., read requests for application state information, as well as write requests that may result in changes to application state if approved) from clients 150, such as App1 clients 150A-150E in the depicted embodiment. Each of the clients 150 may for example comprise a respective process or thread of execution running at respective hosts in some embodiments, which may also be distributed among the availability containers 105. For some applications, client nodes or processes may also or instead be located outside the provider network.

Some or all of the servers of a DSM may have the necessary software and/or hardware capabilities to serve as jurors in various embodiments. In the depicted embodiment, the DSM 160 comprises nine servers, each of which is qualified to serve as a juror, and all the servers are therefore referred to as jury candidate servers (JCSs). At the point of time corresponding to the state of system 100 as represented in FIG. 1, JCS 140A and 140B are located in AC 105A, while JCS 140C is located in AC 105B. AC 105C includes JCSs 140D, 140E and 140F, while AC 105D includes JCSs 140G, 140H and 140I. From among the nine JCSs, a jury 162 of five JCSs (140B, 140E, 140F, 140H and 140I) has been selected in FIG. 1 using a distributed jury selection algorithm comprising a plurality of configuration evaluation iterations run autonomously at each of the JCSs. It is noted that jury members (and not just the non jury JCSs) may also be responsible for handling client-submitted read or write requests with respect to the distributed application such as App1 which is being implemented using the DSM. For example, in FIG. 1, client requests 176A, 176C, 176D and 176E regarding application App1 are submitted to jury members, while client request 176B is submitted to a JCS which is not currently a member of the jury.

In each jury configuration evaluation iteration run at a given JCS 140 in the depicted embodiment, that JCS may generate, using local (and therefore potentially stale) information regarding the current state of the DSM, one or more alternatives or options to the current jury membership. (The JCS's view of the current jury membership may itself be out-of-date in some cases.) The options may be referred to herein as "jury configuration options" or JCOs. In at least some embodiments, the types of changes that can be considered by the JCS when generating JCOs may be limited as described below in further detail with respect to FIG. 6—e.g., only changes that involve the addition or removal from the jury of the JCS implementing the iteration may be permitted.

The JCS may assign respective configuration quality scores (CQSs) to the current jury membership and each of the JCOs based on a plurality of prioritized or weighted criteria. In particular, in the depicted embodiment, a location diversity criterion may be assigned the highest priority, followed for example by a JCS availability status criterion (e.g., whether a given JCS is actively responding to network communications or not) with a lower priority. Location diversity may be interpreted or considered at a variety of granularities in different embodiments as discussed below in further detail. In one simple approach in which location is interpreted primarily at the availability container granularity, the location diversity of a given jury may increase with the number of different availability containers among which the jury members are distributed. In such an approach, if in jury configuration A, the jury members are spread among three availability containers as in FIG. 1, while in jury configuration B the jury members are spread among two availability containers, configuration A may be assigned a higher CQS than configuration B based on A's greater location diversity. In some embodiments, instead of assigning absolute numerical scores, the various JCOs and the current jury may simply be ranked relative to one another—that is, configuration quality ranks (CQRs) may be used instead of CQSs. Of course, CQRs may themselves be obtained trivially on the basis of CQSs in some implementations. Details regarding the different types of prioritized criteria that may be used in various embodiments for ranking and/or scoring jury configuration quality are provided below with respect to FIG. 5.

Continuing the configuration evaluation iteration, the JCS may determine whether any of the JCOs has a higher quality (as determined by the CQSs and/or CQRs) than that of the current jury in various embodiments. If a particular JCO meets a quality criterion (e.g., if it simply ranks higher than the current jury, and/or if its CQS exceeds that of the current jury by some threshold), in at least some embodiments the JCS may submit a proposal for a corresponding jury transition to the current jury. If the proposal is eventually accepted, the transition may be incorporated into the state machine SM1 corresponding to the DSM. A local record of the approved transition may be stored at some or all of the JCSs. Subsequent modification requests for App1, submitted by any of the App1 clients 150A-150D, may be approved/rejected by the new jury resulting from the approved jury transition. If an App1-related data modification is approved, an indication of the modification may be stored or replicated at local storage devices at some number of the JCSs in the depicted embodiment. Similarly, subsequent jury transition proposals (e.g., resulting from additional configuration evaluation iterations performed at the various JCSs) may be handled by the new jury, and records indicative of approved jury changes may be replicated at one or more of the JCSs in various embodiments.

Figure 2:
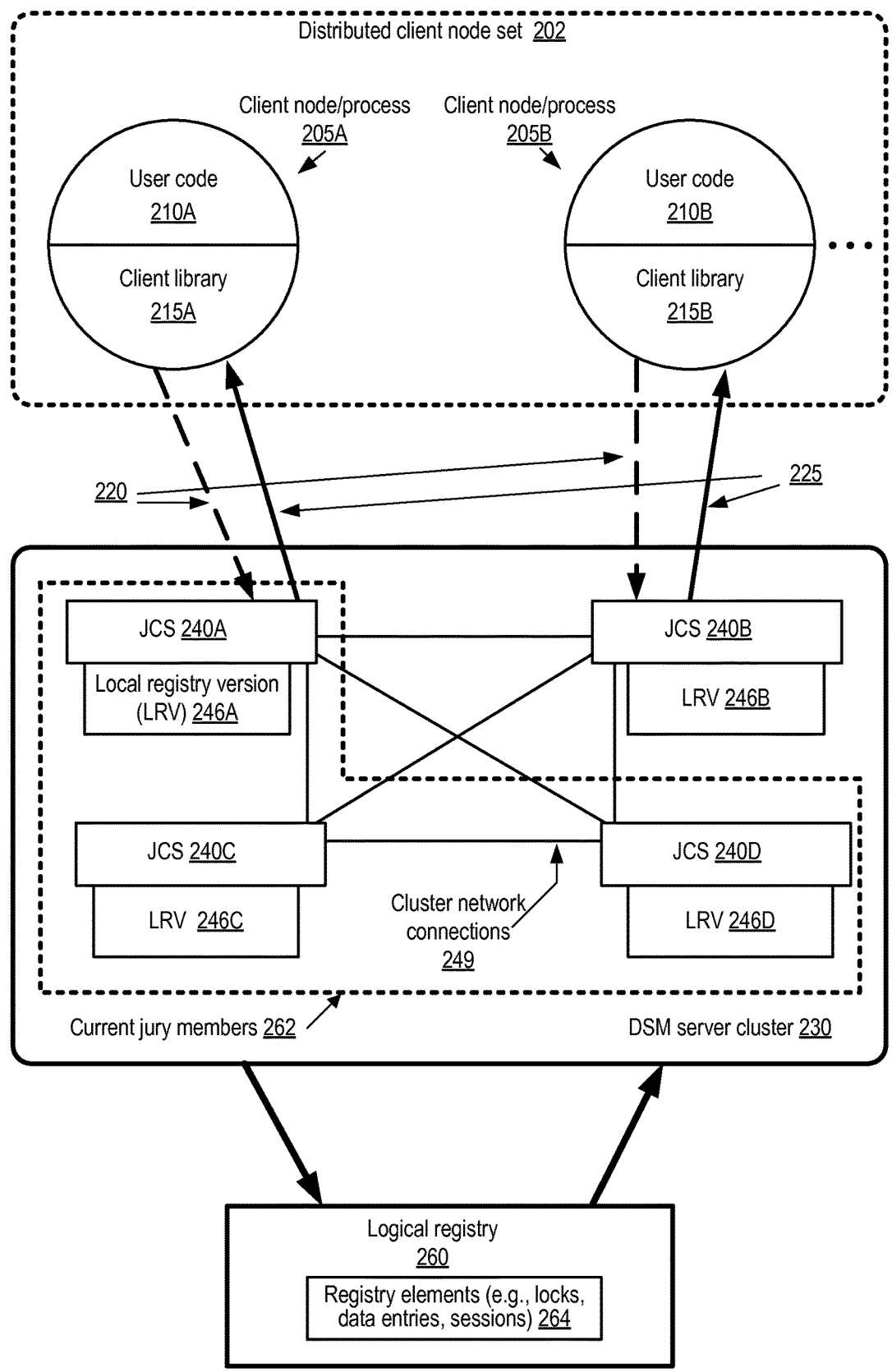
FIG. 2 illustrates an example of replication of state information at various server nodes of a DSM, according to at least some embodiments.

FIG. 2 illustrates an example of replication of state information at various server nodes of a DSM, according to at least some embodiments. The DSM comprises a server cluster 230 of four JCSs 240A, 240B 240C and 240D in the depicted embodiment. While DSM hosts are not illustrated in FIG. 2, at least some of the JCSs may be instantiated at different hosts than others in some embodiments. Three of the four JCSs (240B, 240C and 240D) form the current jury of the DSM in the depicted example scenario. Distributed DSM client node set 202 may comprise any program, or part of a program, that is configured to use a DSM for management of application state. The client node set 202 may comprise a plurality of client nodes 205 (e.g., 205A and 205B), each representing one or more processes or threads of execution. For example, client nodes 305 may represent respective nodes of a distributed storage service application that is configured to receive customer requests over a network and in response, perform various functions on behalf of those customers. In the illustrated embodiment, a client node 205 may comprise an execution of user code 210 and DSM client library components 215. Client node 205A executes user code 210A and client library components 215A, and client node 205B executes user code 210B and client library components 215B. A client library component 215 of the DSM may in some embodiments comprise a software library that exposes one or more programmatic interfaces to user code 210 for interacting with the DSM server cluster 230.

A given client process 205 may communicate with the DSM via any one of the JCSs 240 in the depicted embodiment. As shown in the illustrated embodiment, the various JCSs may communicate with one another via cluster network connections 249. These network connections may be implemented using various types of networks (e.g., Myrinet, Ethernet, Gigabit Ethernet, etc.) in various topologies (e.g., ring, grid, Torus, bus, etc.). In some embodiments, a DSM may be implemented on a fully-connected cluster of computers, where each JCS is on a different physical machine in the cluster, executes a separate instance of the DSM server software, and can communicate directly with every other JCS in the DSM configuration via a network connection.

However, those skilled in the art will appreciate that various other configurations are possible using different physical and/or virtual machines, connected by different network types and/or topologies such as the topologies described above.

According to FIG. 2, the JCSs 240 may work together to maintain state information, e.g., for various client applications and the DSM itself, in one or more logical registries 260. The logical registry 260 may not necessarily be implemented as a separate physical entity, but rather, as a logical entity implemented across multiple JCSs of the DSM. For example, in the depicted embodiment, each JCS 240 may keep a respective local registry version (LRV) 246 (e.g., LRV 246A at JCS 240A, LRV 246B at JCS 240B, and so on) comprising a portion or all of the contents of logical registry 260. Through a consensus or quorum-based protocol, the JCSs may agree on state transitions for each JCS to apply to its LRV 246, thereby collectively maintaining a single logical registry 260. Each JCS 240 may thus maintain a cached copy of the registry that is valid as of the last registry transition (i.e., update to state information) known at the node. In some embodiments, each transition may be associated with a registry logical timestamp, such as in a monotonically increasing 64-bit integer or counter agreed upon by the DSM jury. This timestamp may be a physical or logical time in different embodiments, and may be referred to as the "DSM time". In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. The registry logical timestamp may also be referred to as a commit sequence number in some embodiments, and respective commit sequence numbers may also be associated with accepted jury transitions. In some embodiments, each JCS 240 may maintain its own local registry timestamp, indicative of the most recent transition of the logical registry that is reflected in the local LRV at that JCS. At any point in time, in some implementations, the value of the local registry timestamp at a given JCS 240 may differ from the value of the local registry timestamp of another JCS; however, if and when two JCSs have the same local registry timestamp values, the data in their respective LRVs 346 may be identical (i.e., both local LRVs may be guaranteed to have applied the same set of updates).

In some embodiments, the logical registry 260 may include several types of elements and associated metadata, such as lock objects, data entries, session objects representing connections to client processes 205, and the like. In some embodiments, the DSM may maintain multiple logical registries to store data relevant to respective applications (e.g., including a separate registry for the DSM's own configuration). The DSM server cluster 230 may act as a mediator between the client processes 205 and one or more logical registries 260 in the depicted embodiment. The client process 205 may interact with a logical registry 260 by submitting transactions 220 to the DSM server cluster 230. In some embodiments, requests to read state information may also be submitted as transaction requests—that is, a given transaction may comprise reads, writes, or reads and writes. Through a read transaction, a client process may read information such as locks, entries, or sessions from the logical registry 360. Using a write transaction, a client process 205 may update information in the logical registry 260. The DSM may determine the outcome of various transactions requested by clients, e.g., using a majority vote of the jury in the case of client-requested modifications to application state. Event notifications (e.g., as indicated by the arrows labeled 225 in FIG. 2) indicating the transaction outcomes may be provided to interested client processes 205 in at least some embodiments.

Figure 4:
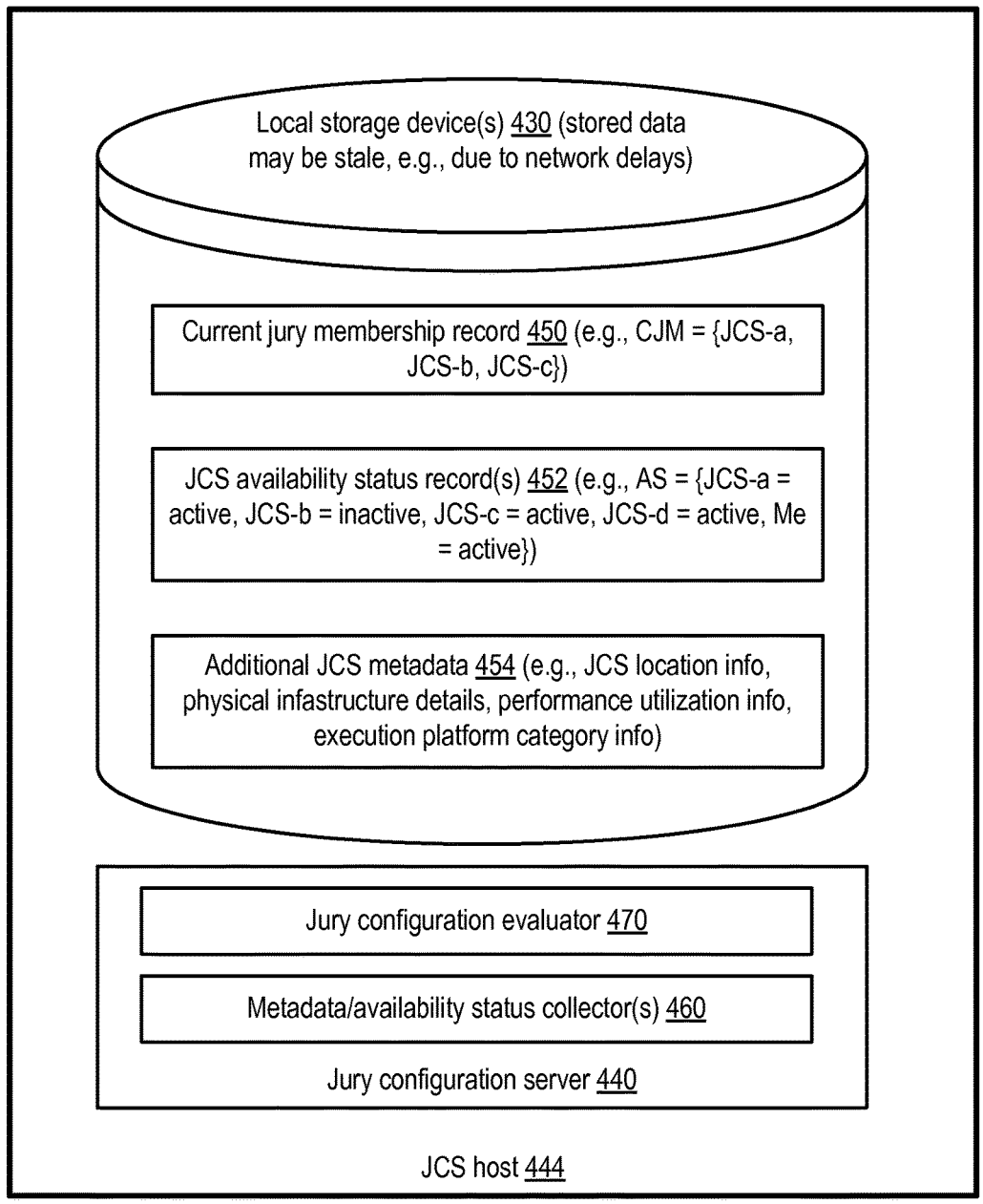
FIG. 4 illustrates examples of the kinds of information that may be used by a particular jury candidate server (JCS) of a DSM to identify alternative jury configurations, according to at least some embodiments.

In various embodiments, the JCSs 240 may replicate jury configuration-related information in a manner very similar to that described for application state information (locks, entries, sessions etc.) above. Similarly, jury transitions (which may be proposed or requested by the JCSs themselves, rather than by external client nodes 205) may be handled in a manner analogous to that in which client transactions requesting application state transitions are handled. Examples of the kinds of information which may be maintained specifically regarding jury state are shown in FIG. 4 and discussed in further detail below.

Jury Membership Change Overview

Figure 3:
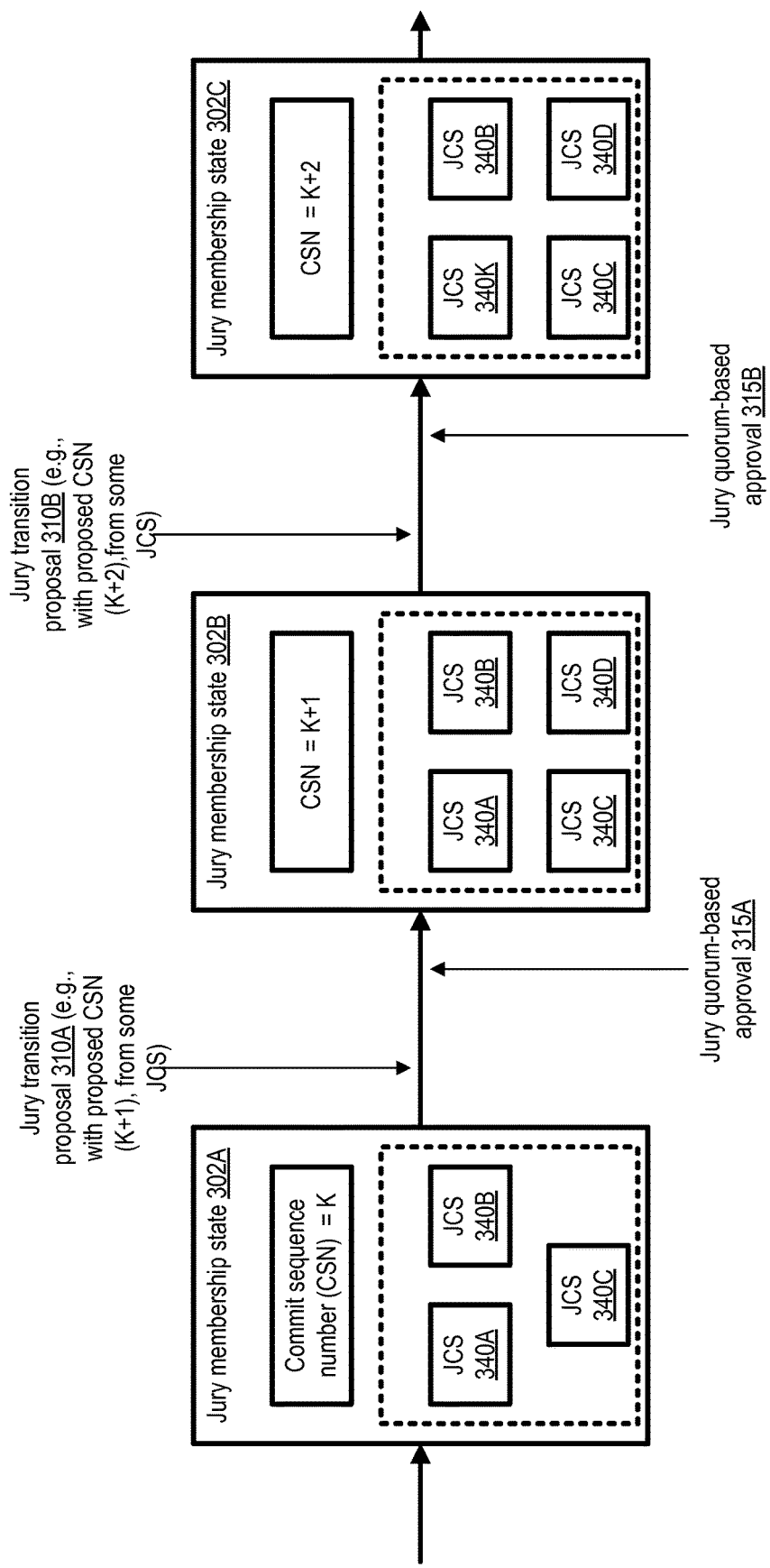
FIG. 3 illustrates a high-level overview of jury membership changes at a DSM, according to at least some embodiments.

FIG. 3 illustrates a high-level overview of jury membership changes at a DSM, according to at least some embodiments. The lifetime of a jury may be modeled as a sequence of approved states in the depicted embodiment. Three example approved states, 302A 302B and 302C are shown for the jury membership in FIG. 3. In state 302A, the jury comprises JCSs 340A, 340B and 340C. In state 302B, a fourth JCS, 340D has been added to the jury. In state 302C, JCS 340K has replaced JCS 340A in the jury.

Each jury membership state may result from a corresponding jury transition proposal generated by at least one of the JCSs of the DSM in the depicted embodiment. For example, jury transition proposal 310A may have led to the inclusion of JCS 340D to the jury, while jury transition proposal 310B may have led to the replacement of JCS 340A by JCS 340K. Each such proposed transition may have to be approved by at least a quorum (e.g., a simple majority) of the current jury. Thus, jury quorum-based approval 315A may have led to state 302B, and jury quorum-based approval 315B may have led to state 302C. Of course, the definition of "quorum" may change as the jury membership changes in some implementations. In at least some embodiments, each approved transition may be implemented as an atomic operation. In such an embodiment, even though some transitions may appear to involve two or more smaller changes (e.g., the removal of 340A and the addition of 340K between states 302B and 302C), either all the smaller changes may be applied, or none of the changes may be applied.

Each approved jury state or configuration may have a corresponding commit sequence number (CSN) associated with it in the depicted embodiment, indicative of the order in which the corresponding transition proposals were accepted. In at least some embodiments, logical timestamps of the kind described above with respect to the DSM registry may be used as the CSNs. In some implementations, integer counters may be incremented to obtain CSNs corresponding to successive approved jury transitions. For example, state 302A is shown with CSN K, state 302B has CSN (K+1), and state 302C has CSN (K+2). As discussed above, each JCS may store one or more local records indicative of the current jury membership in at least some embodiments. Thus, each JCS may have its own view of the most recent change approved for the jury, as indicated by the highest CSN among the locally stored CSNs. When proposing a jury transition based on a configuration evaluation iteration of the kind discussed above, in at least some embodiments, a JCS may include a proposed CSN for the new jury state which would be reached if the transition were approved (or, alternatively, the CSN corresponding to the most-recently-approved jury state, to which the proposed change is to be applied). The transition proposal 310A which led to state 302B may have included (K+1) as a proposed CSN (or K as the CSN of most-recently-approved jury), while the transition proposal which led to state 302C may have indicated (K+2) as the proposed CSN (or (K+1) as the CSN of most-recently-approved jury). If a particular JCS (JCS-m) has locally stored jury configuration state records with CSNs K, (K+1) and (K+2), and no CSNs higher than (K+2), JCS-m may indicate that a CSN of (K+3) should be used for its next proposed jury state. Meanwhile, it may be the case that the jury has already approved a different transition with a CSN of (K+3), submitted by a different JCS (JCS-n), and JCS-m has not yet received a notification of the approved transition proposed by JCS-n. In such a scenario, JCSs which have already received an indication of the approved transition corresponding to CSN (K+3) may be able to reject JCS-m's proposal simply by comparing the proposed CSN with their own local records of approved transitions. In at least some implementations in which the proposal indicates the CSN of the most-recently-approved jury state (as viewed by the proposer), a jury member which receives a transition proposal may use the CSN to verify that the proposer's view of the most recent approved change to the jury matches the jury member's view. If the jury member finds a discrepancy between its own view of the most recent approved jury state and the view of the proposer, this may lead to a rejection of the proposed transition.

Local Information Used for Jury Configuration Evaluation

FIG. 4 illustrates examples of the kinds of information that may be used by a particular jury candidate server (JCS) of a DSM to identify alternative jury configurations, according to at least some embodiments. As shown, a JCS host 444 may include one or more local storage devices 430 in the depicted embodiment, comprising a local cache or replica of various types of data records used for jury configuration management. The JCS 440 may comprise one or more subcomponents, e.g., respective processes or threads of execution implementing a jury configuration evaluator 470 and one or more metadata or availability status collectors 460. A variety of different local storage devices 430 may be used in different embodiments, such as rotating disk-based storage devices, solid state drives (SSDs), and the like. In some embodiments, at least some of the jury configuration management records may be stored only in the main memory of the host 444 (and may not be written to disk-based storage).

In the depicted embodiment, at least three types of configuration records may be stored at the storage devices 430. One or more records 450 indicative of the current jury configuration may be stored, for example, indicating that the jury currently comprises JCS-a, JCS-b and JCS-c. In some embodiments, instead of a single record 450 that indicates a snapshot of the complete jury membership, a sequence of records indicative of approved changes to the jury membership may be stored, and such a sequence may be examined to determine the current jury membership. In at least some embodiments, some or all of the jury membership record(s) 450 may include a respective CSN of the kind discussed with respect to FIG. 3.

One or more JCS availability status records 452 may also be stored in local storage in various embodiments. The availability status records may indicate whether various JCSs of the DSM are known to be responsive to network messages (such as heartbeats sent from an availability status collector 460 or from an external health management service agent not shown in FIG. 4). For example, if a particular JCS such as JCS-b does not respond to h successive heartbeat messages within s milliseconds, the status of that JCS may be set to "inactive" in one implementation. Other JCSs, which respond in a timely fashion to heartbeats or other health status checking messages, may be marked as "active" (e.g., JCS-a, JCS-c, JCS-d, and "Me", indicating the local JCS 440 itself). Respective availability status records 452 corresponding to all the (locally-known) JCSs of the DSM may be stored in some embodiments (including the JCS 440 running at the same host 444 at which the records are stored). In other embodiments, cumulative records indicative of the status of some combination or all of the JCSs of the DSM may be stored. In some embodiments, the availability status records 452 may also include sequence numbers or logical timestamps indicative of the order in which the availability status records were generated.

In at least some embodiments, additional metadata 454 pertaining to the DSM's JCSs may be stored locally at each JCS. The additional metadata may include, for example, location information about the JCSs, such as the respective availability container, data center, data center room, and/or server rack at which each of the JCSs is instantiated. In one embodiment, details about various other elements of the physical infrastructure, such as the particular power supply units, heating/cooling equipment units, and the like may also be stored corresponding to some or all of the JCSs. Performance utilization metrics (e.g., obtained by metadata collector 460) may be retained for some or all of the JCSs in various embodiments, e.g., for some recent time window. In some embodiments, details about the execution platforms used for JCSs (e.g., the vendor and/or CPUs of the JCS hosts, the name or version of the operating system being used at the JCS host, etc.) may also be stored in local storage devices 430. Some or all of these types of metadata may be used by the jury configuration evaluator 470 to generate and rank jury configuration options based on a prioritized set of criteria in various embodiments, as discussed below in the context of FIG. 5. Locally stored information of the kind illustrated in FIG. 4 may at least in some cases differ from one JCS to another, e.g., due to network delays or due to lost updates. Thus, in various embodiments, different JCSs of a DSM may not always make jury configuration decisions based on identical views of the current jury membership, identical views of JCS availability status, and/or identical additional metadata 454. Despite this potential lack of synchronization, however, at least in embodiments in which the same types of criteria are used by each of the JCSs in evaluating jury configuration options, the distributed algorithm for identifying new jury configurations may converge fairly quickly in most scenarios.

Prioritized Criteria for Ranking Jury Configurations

FIG. 5 illustrates examples of prioritized criteria that may be used to determine the relative quality rankings of alternative jury configurations, according to at least some embodiments. Column 502 of table 500 lists a plurality of criteria, while column 504 indicates example relative priorities which may be assigned to the different criteria for quality ranking purposes in at least some embodiments, with a higher numerical value representing a higher priority.

Location diversity 506 may be accorded the highest priority or the highest weight when judging jury configuration quality in the depicted embodiment. Thus, the jury with the highest degree of physical dispersal (as measured by some combination of the distinct number of availability containers, data centers, data center rooms, or server racks used for the jury members) may be assigned the highest CQS (configuration quality score) or the highest CQR (configuration quality ranking) It is noted that the numerical weights/ priorities (10, 6, etc.) shown in column 504 are provided simply as examples, and the example values shown in FIG. 5 may not be used in at least some embodiments. The server availability status 508 of the JCSs may be ranked slightly lower than location diversity 506 as a quality-determining factor in the depicted embodiment. In practice, this may lead to the following approach regarding potential jury modifications: first modifications that represent increases in location diversity may be considered, and then, among jury configurations with equivalent location diversity, JCS availability status may be considered as the ranking criterion. As a result of the higher weight granted to location diversity than to availability, in some embodiments proposed jury configurations that include one or more inactive JCSs may be preferred to alternatives that only include active JCSs. An example of such a scenario is illustrated in FIG. 7b and described below.

In some embodiments, only location diversity and availability status may be considered when assigning quality rankings to possible jury configurations. In other embodiments, one or more other criteria such as physical infrastructure component independence 510, server performance or utilization metrics 512, and or execution platform diversity 514 may also or instead be taken into account. While some aspects of the physical infrastructure may be captured by location information (e.g., because different availability containers may typically use disjoint sets of physical infrastructure), in at least some embodiments more detailed metadata such as the mappings between JCSs and universal power supplies (UPSs) or specific heating/cooling units may be available. Such details regarding the specific physical infrastructure components on which various JCSs rely may be usable to distinguish among different jury configurations in a more fine-grained manner than based simply on the location information available. In general, greater diversity in physical infrastructure dependencies may correspond to higher quality rankings for juries. In some embodiments, jurors whose CPU, network and/or storage device utilization levels (e.g., as measured over some recent time window leading up to the present time, or close to the present time) are lower may be considered higher quality than more heavily-utilized jurors, e.g., under the assumption that the less-utilized jurors would respond more quickly to state transition requests. In at least one embodiment in which several distinct types of execution platforms (such as hosts from different vendors, hosts with different CPU architectures/speeds, or hosts with different operating systems or operating system versions) are available for JCSs, a jury implemented using a more diverse group of platforms may be deemed to have a higher quality, e.g., under the assumption that the probability of correlated software/hardware failures may decrease as the execution platform diversity of the jury increases. In at least one embodiment a numerical CQS value may be computed for each jury configuration option using a function with respective input parameters corresponding to some or all of the criteria shown in column 502 of table 500.

Permissible Jury Modifications

Figure 6:
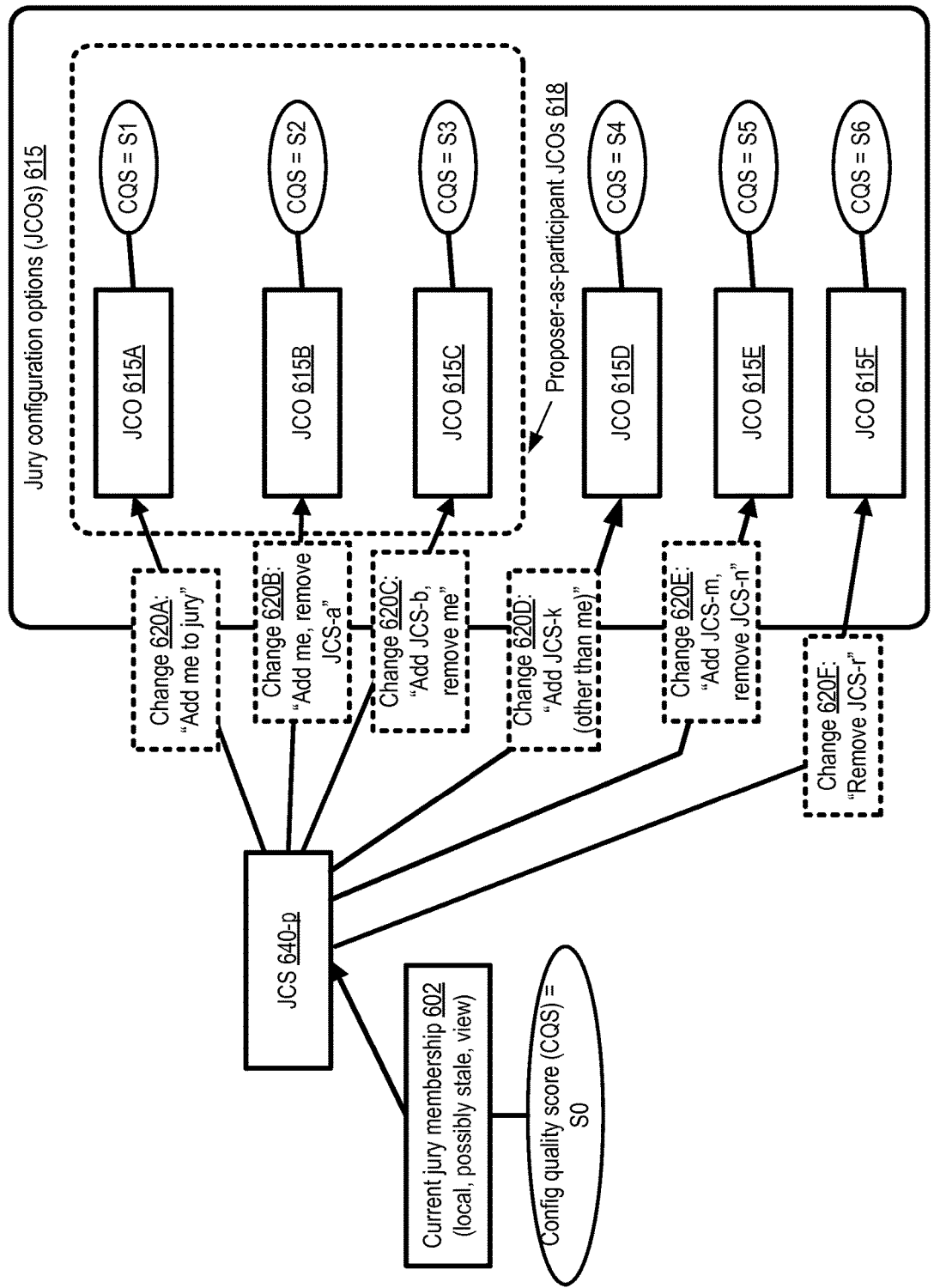
FIG. 6 illustrates examples of the types of jury membership transition options that may be generated and evaluated by a JCS, according to at least some embodiments.

FIG. 6 illustrates examples of the types of jury membership transition options that may be generated and evaluated by a JCS, according to at least some embodiments. In the depicted embodiment, a given JCS 640-$p$ (the "proposer" JCS) may generate two broad categories of jury configuration changes: those in which JCS 640-$p$ is a participant in the changes (by either joining or leaving the jury and thereby changing JCS 640-$p$'s jury membership status), and those in which the changes do not involve the participation of JCS 640-$p$. The first category of jury configuration options (JCOs) 615 may be referred to herein as "proposer-as-participant" JCOs 618. In change 620A, for example, which corresponds to JCO 615A, JCS 640-$p$ considers adding itself as a member of the current jury (based on JCS 640-$p$'s local, possibly stale view of the current jury membership 602). In change 620B leading to JCO 615B, JCS 640-$p$ would be added to the jury while a different JCS (JCS-a) identified by JCS-p during JCS-p's latest configuration evaluation iteration would be removed from the jury. In change 620C leading to JCO 615C, JCS 640-$p$ would be removed from the jury while a different JCS (JCS-b) identified by JCS-p during JCS-p's latest configuration evaluation iteration would be added to the jury.

In change 620D, a different JCS (JCS-k) than the proposer JCS 620-$p$ would be added to the jury. In change 620E, the roles of two other JCSs, JCS-m and JCS-m with respect to jury membership would be switched—JCS-m would be added to the jury, while JCS-n would be removed. In change 620F, JCS-r (a different JCS than the proposer) would be removed from the jury. As shown, each of the changes 620 corresponds to a respective JCO 615 for which a respective configuration quality score (CQS) may be determined by the JCS-p in the depicted embodiment, e.g., using some combination of the criteria discussed in the context of FIG. 5 above. For example, CQSs S1, S2, S3, S4, S5 and S6 may be determined for JCOs 615A-615F respectively. In addition, JCS-p may also compute, using the same criteria, a CQS S0 corresponding to the current jury configuration in the depicted embodiment. If one or more of the CQSs of JCOs 615A-615F meet a threshold criterion with respect to CQS S0 of the current jury, JCS-p may propose a jury transition (for approval by the current jury) corresponding to one such JCO in some embodiments. In some embodiments, for example, if multiple JCOs meet the threshold criterion, e.g., by exceeding S0 by at least a small non-zero value, the JCO with the highest CQS among the multiple JCOs may be selected as the one to be proposed. In other embodiments, a more sophisticated approach may be taken with respect to selecting the JCO to be proposed for implementation—e.g., the proposer JCS-p may take into account some metric or estimate of the accuracy of the data used for evaluating the different CQSs. For example, consider a scenario in which two JCOs JCO-x and JCO-y have the same CQS and both meet the threshold for superiority with respect to the current jury. If the metadata on the basis of which JCO-x's CQS was computed has been received more recently (or from more reliable sources) by JCS-p than the metadata on the basis of which JCO-y was scored, JCO-x may be selected for implementation in some embodiments.

In at least some embodiments, JCSs such as 640-$p$ may only be permitted to generate, evaluate and/or propose JCOs of the proposer-as-participant category, e.g., based on the assumption that decisions involving the proposer are likely to be based on more reliable configuration records than decisions involving potentially distant JCSs with which interactions of the proposer may not be very frequent. A JCO selection policy that enforces such restrictions on the permissible JCOs may also have the side benefit of reducing the number of alternatives that have to be compared, which may be useful in embodiments in which the DSM comprises a large number of JCSs. In some embodiments in which the set of feasible jury configuration changes may be quite large, a JCS may limit the number of modifications it evaluates in a given iteration of the algorithm to some pre-selected maximum, or stop considering additional options when a selected amount of computational resources have been used up. In other embodiments, more exhaustive searches of the set of feasible configurations may be permitted in at least some configuration evaluation iterations.

Examples of Relative Quality Rankings for Jury Configurations

FIG. 7a-7f illustrate respective examples of jury configuration differences and corresponding relative quality rankings, according to at least some embodiments. Each of the FIGS. 7a-7f indicates the relative configuration quality scores (CQSs) of a pair of jury configuration options (JCOs) which differ from each other with respect to one or more of the criteria illustrated in FIG. 5. To simplify the presentation, each jury comprises exactly three members in all the examples included in FIG. 7a-FIG. 7f, so that the total number of jurors is not a factor when comparing the alternatives. Absolute CQS values, which may be computed using a variety of techniques and functions in different implementations, are not shown in FIG. 7a-FIG. 7f. As mentioned earlier, in at least some embodiments a given JCS may not even assign absolute scores to different jury configuration options, and may simply rank the options relative to one another.

In FIG. 7a, JCO 715A comprises respective jury members (JMs) 740A-740C in each of three availability containers 710A-710C. Each of the JMs is in "active" state with respect to availability. In contrast, JCO 715B has active jury members distributed across only two availability containers: JMs 740A and 740B are both in AC 710B, and JM 740C is in AC 710C. Accordingly, in an embodiment in which greater location diversity leads to higher quality scores, the CQS determined for JCO 715A would be higher than the CQS determined for JCO 715B. It is noted that in FIG. 7a-FIG. 7f, the subset of the JCO characteristics that contribute to differences in quality scores/rankings are emphasized; that is, other characteristics of the two jury configurations of each pair may be assumed to be identical. For example, the type of execution platform used for all three jury members in JCOs 715A and 715B may be assumed to be identical.

FIG. 7b provides an example of a scenario in which prioritizing location diversity above availability status may result in a higher quality ranking for a jury with an inactive member. As shown, in JCO 715C, three jury members 740A-740C are located within respective availability containers 710A-710C. 740A and 740C are each in active state, while 740B is inactive. As mentioned earlier, a given DSM server such as current jury member 740B may be designated as inactive based on the fact that it has not responded in a timely manner to one or more health checking network messages directed to it. In practice, a DSM server designated as inactive may in some cases actually be up and running, e.g., if a network problem prevents it from receiving the health check messages, or prevents its responses to the health checks from being received at their intended destinations in a timely manner. Of course, it may also be the case that a server such as jury member 740B which is designated as inactive is actually shut down, e.g., due to a failure or a scheduled maintenance event, or is in the process of recovering from some event and is not able to respond to health checks. In JCO 715C, 740B may be retained in the jury at least in part due to the location diversity it adds to the jury, despite its inactive status. In JCO 715D, in contrast, the jury comprises three active members, two (740B and 740C) in AC 710C and one (740A) in AC 710A. Despite the fact that all three of its members are in active states, JCO 715D may be assigned a lower quality ranking or CQS than JCO 715C in the depicted embodiment, due to JCO 715C's greater location diversity.

FIG. 7c and FIG. 7d illustrate examples of location diversity criteria applied at a different granularity than the availability container level which was illustrated in FIG. 7a and FIG. 7b. In FIG. 7c, a given availability container 710A includes two data centers, DC 720A and DC 720B. Three jury members are located within AC 710A. In JCO 715E, both data centers are used for the jury members: two members (740A and 740B) are in DC 720A and one (740C) is on data center 720B. In contrast, in JCO 715F, all three jury members are located in data center 720A. Applying the location diversity criterion at the data center level, JCO 715E is assigned a greater CQS than JCO 715F. In FIG. 7d, location differences within a given data center 720A, as well as differences in physical infrastructure components used for the jury members are used to assign different CQSs. The data center 720A may comprise numerous server racks within which the particular hosts being used for the jury members are housed, such as racks 730A and 730B with respective uninterruptible power supplies (UPSs) 750A and 750B. All other factors being equal, a JCO such as 715G in which the three jury members (740A-740C) are distributed among two racks may be assigned a higher CQS than JCO 715H in which all three jury members are in the same rack 730A.

In at least some embodiments, a number of different types of execution platforms may be used for DSM servers, with the platform types differing from each other in such factors as the host vendor, the CPU or processing core architecture, the number of CPUs or cores, the networking hardware used, the operating system used, and/or various other software or hardware components. Under the assumption that correlated failures are more likely to occur within a set of execution platforms of the same type than within a set of diverse execution platforms, juries that are deployed on a variety of execution platforms may be assigned higher quality ranks or scores in at least some embodiments, all other factors being equivalent. In FIG. 7e, the three jury members 740A-740C of JCO 715H are respectively instantiated at different types of execution platforms 760A-760C. In contrast, in JCO 715J, two of the jury members (740A and 740B) are deployed on the same type of execution platform 760A. Accordingly, due to the fact that the set of execution platforms used is more diverse in JCO 715H than in JCO 715J, JCO 715H may be assigned a higher CQS.

In some embodiments, CQSs may be assigned based at least in part on performance or utilization considerations, e.g., under the assumption that jury members whose resources (e.g., CPUs) are much more heavily utilized may not be able to perform their jury functions as quickly or responsively as jury members which are less heavily utilized. In FIG. 7f, JCOs 715K and 715L each comprise three jury members at respective hosts 770A, 770B and 770C. Metrics on the average CPU utilizations over some selected recent time window of the three hosts may be collected, e.g., by a monitoring service affiliated with the DSM or by individual JCSs (including the jury members shown) at which jury configuration evaluation iterations are performed. In JCO 715K, each of the hosts has a CPU utilization level between 50% and 55%. In contrast, in JCO 715L, host 770D of JM 740C has a 78% CPU utilization level, while the CPU utilizations of the other two hosts are in the 50%-55% range. Because of the substantially higher CPU utilization level of host 770D, assuming all other factors are equivalent between the two JCOs 715K and 715L, JCO 715L may be assigned a lower CQS than JCO 715K in the depicted embodiment. Utilization levels (and/or other performance related metrics such as average queue lengths) of other types of JCS resources, such as memory, storage or network devices, may also or instead be used to compare different configuration options in some embodiments.

Methods for Managing DSM Juries

Figure 8:
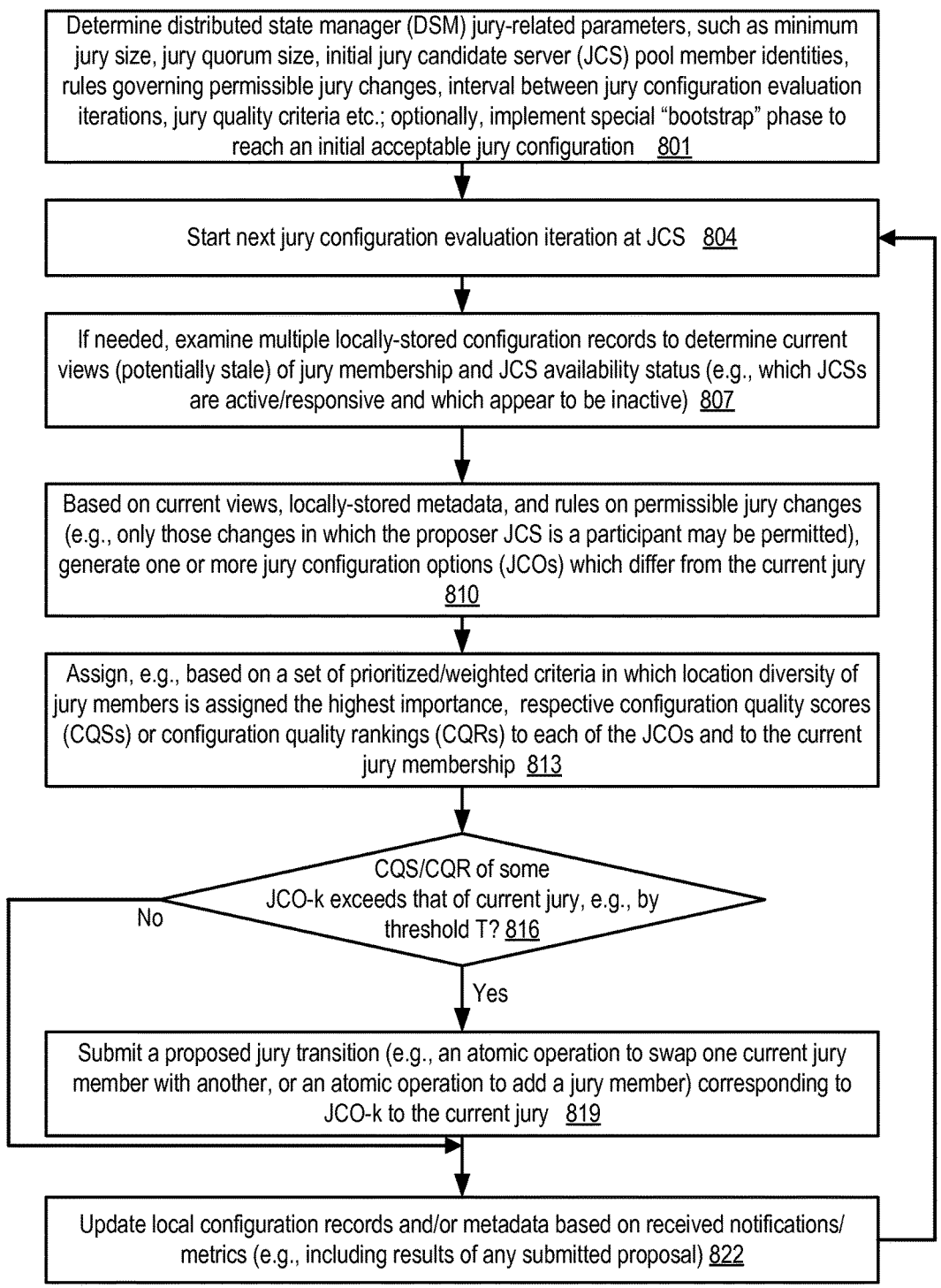
FIG. 8 is a flow diagram illustrating aspects of operations that may be performed for jury membership management at servers of a DSM, according to at least some embodiments.

FIG. 8 is a flow diagram illustrating aspects of operations that may be performed for jury membership management at servers of a DSM, according to at least some embodiments. As shown in element 801, a number of parameters and policies regarding DSM jury management may be identified or determined, e.g., in an initialization phase of the DSM's operation in the depicted embodiment. Such parameters may include, for example, a preferred or required minimum jury size, a jury quorum size (e.g., the number or percentage of jurors which have to approve a requested state transition in order to make the transition persistent), identifiers of the initial set of JCSs, rules governing permissible jury changes (e.g., whether only proposer-as-participant changes of the kind illustrated in FIG. 6 are permitted, or a broader set of changes are permitted), intervals between jury evaluation iterations, jury quality criteria (including associated priorities), and so on. In at least one embodiment, a DSM may implement a special initial "bootstrap" phase, during which the minimum number of members are added to an initially empty jury, potentially using different rules regarding jury membership changes than are enforced during steady state or normal mode operations after the initial jury is populated. As the composition of the jury changes, the various JCSs of the DSM may each add entries to their local caches comprising configuration records of the kinds illustrated in FIG. 4.

In some embodiments, as soon as a JCS joins the DSM (or after the initial DSM bootstrap phase is completed), it may begin performing jury configuration evaluation iterations, e.g., at regular intervals based on the DSM's configuration parameters, and/or in response to events such as potential detections of failure of one or more jury members. When its next evaluation iteration is triggered or initiated (element 804), if needed, a JCS may use some subset or all of its locally-stored records to determine its current views of the current jury membership (i.e., which JCSs it believes are currently members of the jury) and of the availability status of all the JCSs of the DSM (i.e., whether each of the JCSs is in an inactive state or an active state) (element 807). In some iterations, the views of the jury membership and/or the availability status may be inaccurate or out-of-date, e.g., due to the fact that the JCS performing the iteration may not yet have received the latest updates from other JCSs. In at least one embodiment, only a single record representing a snapshot or point-in-time representation of the DSM may have to be examined—e.g., the JCS may not need to combine information stored in several different local records.

Based on some combination of (a) its current view of the jury configuration, (b) its current view of JCS availability status, (c) locally-stored metadata of the kind discussed in the context of FIG. 4 and FIG. 5, and (d) rules on permissible jury changes (e.g., only those changes in which the proposer JCS is a participant may be permitted in some embodiments), the JCS may generate one or more jury configuration options (JCOs) which differ from its view of the current jury configuration (element 810). The different JCOs and the current configuration may be assigned respective configuration quality scores and/or rankings based on a set of prioritized or weighted criteria (element 813). In at least some embodiment, a location diversity criterion may have the highest priority among the criteria. The criteria considered may include, in addition to location diversity, the availability status of the JCSs, execution platform diversity, resource utilization or other performance-related measures, independence of physical infrastructure components, and the like in various embodiments. In at least some embodiments, the JCO quality scores/rankings may be computed as the JCOs are generated—e.g., the JCS performing the evaluation iteration may not be required to first generate the JCOs and then in a later step assign quality measures to the JCOs. In at least one embodiment, a JCS may determine the current jury configuration's quality score first, and then start generating JCOs. In some such embodiments, as soon as a sufficiently superior JCO is found (e.g., a JCO whose CQS exceeds that of the current jury by some threshold T), the JCS may stop generating additional JCOs.

If a particular JCO (JCO-k) meets a quality threshold relative to the current jury (as determined in element 816), a corresponding jury transition proposal may be submitted by the JCS to the current jury (element 819) in the depicted embodiment. The jury transition may comprise, for example, any of the types of jury membership modifications illustrated in FIG. 6, such as an atomic swap of one jury member by another, an addition of a new member, etc. In at least some implementations, the jury transition proposal may include an indication of a commit sequence number corresponding to the most-recently-approved transition of the jury (indicating the particular state of the jury to which the change is being proposed) and/or a commit sequence number corresponding to the state that the jury would reach if the proposal were accepted. Such commit sequence numbers may be used by the jury members receiving the proposal to determine whether the proposal should be accepted—e.g., if a jury member's own view of the most-recently-accepted jury transition differs from that of the proposer, the proposal may be rejected. If none of the JCOs generated during the evaluation iteration meets the quality threshold criterion (as also detected in operations corresponding to element 816), no proposal may be submitted to the jury. The evaluating JCS may continue its normal operations, such as updating its local configuration records and/or metadata (element 822) until the next evaluation iteration is triggered. If a proposal submitted by the JCS is approved by a quorum of the current jury, for example, a record the change to the jury membership may be stored locally at the JCS and used in further processing of client requests and in subsequent configuration evaluation iterations. When the next iteration is begun, operations corresponding to elements 804 onwards may be repeated.

It is noted that in various embodiments, some of the operations shown in FIG. 8 may be implemented in a different order than that shown in the figure, or may be performed in parallel rather than sequentially. Additionally, some of the operations shown in FIG. 8 may not be required in one or more implementations—e.g., in one implementation in which full snapshots of the entire DSM configuration are generated whenever any JCS leaves, joins, or changes jury membership status, no additional work may be required to generate the current views of the jury and/or JCS availability status.

Use Cases

The techniques described above, of using prioritized criteria to assign quality scores or rankings to alternate jury configurations of a DSM, and implementing jury transitions based on such quality metrics, may be useful in a variety of environments. In many provider network environments, for example, DSMs may be used to support a variety of mission-critical applications and services, and avoiding DSM delays or outages (e.g., periods when a quorum of the jury is unavailable) even in the presence of large-scale failure events may be an extremely important goal. Even though some provider networks may already be organized into availability containers with independent failure profiles, for example, DSMs may have to be designed to operate effectively even when one or more of the availability containers become unreachable. By using location diversity as a primary criterion for selecting DSM jury members, prioritized even above juror availability status, provider network operators may be able to handle various types of failure scenarios (such as scenarios involving failures of multiple availability containers in quick succession, followed by quick recoveries of the multiple availability containers) more gracefully than if a different prioritization scheme were used.

Illustrative Computer System

Figure 9:
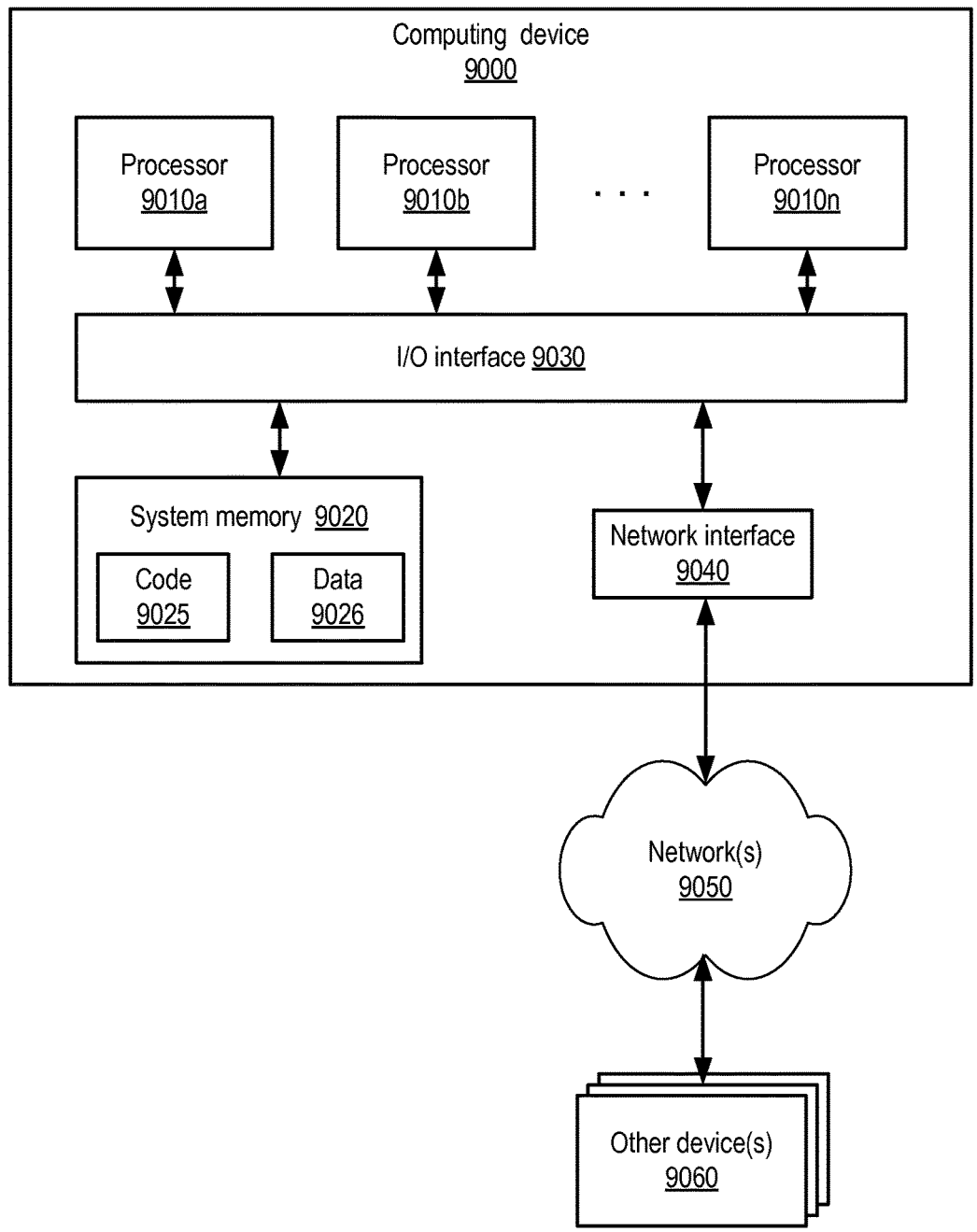
FIG. 9 is a block diagram illustrating an example computing device that may be used in at least some embodiments.

In at least some embodiments, a server that implements one or more of the techniques described above for DSM jury selection (such as the JCS configuration evaluation iterations) may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a provider network, the one or more computing devices comprising one or more processors and memory storing program instructions that are executable by the one or more processors to instantiate a plurality of jury candidate servers (JCSs) of a distributed state manager (DSM), including a particular JCS, wherein one or more JCSs of the plurality of JCSs are designated as members of a jury responsible for determining whether to accept proposed transitions to at least a first state machine representing a distributed application; and
   one or more client nodes of the distributed application;
   wherein the particular JCS is configured to implement a sequence of configuration evaluation iterations, wherein a particular configuration evaluation iteration of the sequence comprises:
      obtaining, using one or more locally-stored records at the particular JCS, (a) a first view of a respective availability status of individual JCSs of the plurality of JCSs, and (b) a second view of membership of a current jury;
      generating one or more jury configuration options (JCOs) based at least in part on the first and second views, wherein a particular JCO of the one or more JCOs includes at least one change to the current jury;
      computing, based at least in part on a plurality of prioritized criteria including (a) a location diversity criterion assigned a first priority and (b) an availability status criterion assigned a lower priority than the first priority:
         a respective configuration quality score (CQS) of each of the one or more JCOs; and
         a CQS of the current jury; and
      proposing, for approval by the current jury, in response to a determination that a particular JCO's CQS meets a threshold criterion with respect to the CQS of the current jury, a jury transition corresponding to the particular JCO; and
      in response to determining that the jury transition has been approved, storing a particular local record indicative of a new jury resulting from the jury transition; and
   wherein, in response to an approval by the new jury of a data modification request pertaining to the distributed application and received from a particular client node of the one or more client nodes, the particular JCS is configured to store an indication of the data modification corresponding to the data modification request.

2. The system as recited in claim 1, wherein the one or more JCOs include a first JCO and a second JCO, wherein in accordance with the location diversity criterion, the first JCO is assigned a higher CQS than the second JCO in response to a determination that jury members are distributed among a greater number of availability containers of the provider network in the first JCO than in the second JCO.

3. The system as recited in claim 1, wherein in accordance with the location diversity criterion, a first JCO of the one or more JCOs is assigned a CQS based at least in part on one or more of: (a) a server rack at which a second JCS designated as a jury member in the first JCO is located (b) a data center room in which the second JCS is located or (c) a data center in which the second JCS is located.

4. The system as recited in claim 1, wherein the particular JCO includes, as a member of the jury, at least one JCS which is classified as being in an inactive state by the particular JCS.

5. The system as recited in claim 1, wherein said generating the one or more JCOs comprises:
   identifying, by the particular JCS, one or more permissible jury membership changes, wherein each permissible jury membership change of the one or more permissible jury membership changes includes a change to a jury membership status of the particular JCS; and
   selecting, for the particular JCO, a particular jury membership change of the one or more permissible jury membership changes.

6. A method, comprising:
   performing, by one or more computing devices configured as a particular jury candidate server (JCS) of a plurality of JCSs of a distributed state manager (DSM), one or more configuration evaluation iterations, wherein one or more JCSs of the plurality of JCSs are designated as members of a jury responsible for implementing a state machine representing a particular application, wherein a particular configuration evaluation iteration of the one or more configuration evaluation iterations comprises:
      generating one or more jury configuration options (JCOs), wherein a particular JCO of the one or more JCOs includes at least one change to a current jury membership;
      computing, based at least on part on a plurality of prioritized criteria including a location diversity criterion assigned a highest priority among the plurality of prioritized criteria, a respective configuration quality ranking (CQR) of (a) each of the one or more JCOs and (b) the current jury membership; and
      proposing, for approval by a current jury, in response to a determination that a CQR of a particular JCO of the one or more JCOs meets a threshold criterion, a jury transition corresponding to the particular JCO; and in response to determining that the jury transition has been approved, storing a particular local record indicative of a new jury corresponding to the jury transition.

7. The method as recited in claim 6, wherein the one or more JCOs include a first JCO and a second JCO, wherein in accordance with the location diversity criterion, the first JCO is assigned a higher CQR than the second JCO in response to a determination that jury members are distributed among a greater number of availability containers of a provider network in the first JCO than in the second JCO.

8. The method as recited in claim 6, wherein in accordance with the location diversity criterion, a first JCO of the one or more JCOs is assigned a CQR based at least in part on one or more of: (a) a server rack at which a second JCS designated as a jury member in the first JCO is located (b) a data center room in which the second JCS is located or (c) a data center in which the second JCS is located.

9. The method as recited in claim 6, wherein a first JCO of the one or more JCOs is assigned a CQR based at least in part on an identification of a component of a data center's physical infrastructure which is being used for a second JCS designated as a jury member in the first JCO, wherein the component of the data center's physical infrastructure comprises one of: (a) an electrical component or (b) a cooling component.

10. The method as recited in claim 6, wherein the particular JCO includes, as a member of the jury, at least one JCS which is classified as being in an inactive state by the particular JCS.

11. The method as recited in claim 6, wherein the plurality of prioritized criteria include a server availability status criterion.

12. The method as recited in claim 6, wherein individual ones of the plurality of JCSs comprise respective threads of execution at one of a set of execution platform categories, wherein the execution platform categories of the set differ from one another at least in a performance capacity, and wherein the plurality of prioritized criteria include an execution platform diversity criterion.

13. The method as recited in claim 6, wherein the plurality of prioritized criteria include a server utilization level criterion.

14. The method as recited in claim 6, wherein said generating the one or more JCOs comprises:
identifying, by the particular JCS, a set of permissible jury membership changes, each of which includes a change to a jury membership status of the particular JCS; and
selecting, for the particular JCO, a particular jury membership change of the set of permissible jury membership changes.

15. The method as recited in claim 6, wherein the plurality of JCSs includes a first JCS and a second JCS, and wherein the jury transition comprises an atomic operation which includes (a) an addition of the first JCS to the jury and (b) a removal of the second JCS from the jury.

16. The method as recited in claim 6, further comprising:
storing, by the particular JCS at a local storage device, a plurality of configuration commit sequence numbers (CSNs) corresponding to respective approved jury transitions, wherein said proposing the jury transition includes indicating a particular proposed CSN corresponding to the jury transition, wherein the particular proposed CSN is based at least in part on a maximum CSN among the plurality of CSNs stored at the local storage device.

17. The method as recited in claim 6, wherein said proposing the jury transition comprises providing, by the particular JCS to a particular member of the current jury, an indication of a highest commit sequence number (CSN) corresponding to approved jury transitions stored at a local storage device of the particular JCS, further comprising:
verifying, by the particular member of the current jury prior to approving the jury transition proposed by the particular JCS, that the highest CSN corresponds to a most-recently-approved jury transition.

18. A non-transitory computer-accessible storage medium storing program instructions that when executed on one or more processors implement a particular jury candidate server (JCS) of a plurality of JCSs of a distributed state manager (DSM), wherein the plurality of JCSs include one or more JCSs designated as members of a jury responsible for implementing a state machine, wherein the particular JCS is configured to perform one or more configuration evaluation iterations including a particular configuration evaluation iteration comprising:
generating one or more jury configuration options (JCOs), wherein a particular JCO of the one or more JCOs includes at least one change to a current jury membership;
determining, based at least on part on a plurality of prioritized criteria including a location diversity criterion assigned a highest priority among the plurality of prioritized criteria, a respective configuration quality ranking (CQR) of each of the one or more JCOs; and
proposing, for approval by a current jury, in response to a determination that a particular JCO of the one or more JCOs has a higher CQR than a CQR of the current jury, a jury transition corresponding to the particular JCO; and
in response to determining that the jury transition has been approved, storing a particular local record indicative of a new jury membership corresponding to the jury transition.

19. The non-transitory computer-accessible storage medium as recited in claim 18, wherein the one or more JCOs include a first JCO and a second JCO, wherein in accordance with the location diversity criterion, the first JCO is assigned a higher CQR than the second JCO in response to a determination that jury members are distributed among a greater number of availability containers of a provider network in the first JCO than in the second JCO.

20. The non-transitory computer-accessible storage medium as recited in claim 18, wherein a first JCO of the one or more JCOs is assigned a CQR based at least in part on an identification of a component of a data center's physical infrastructure which is being used for a second JCS designated as a jury member in the first JCO, wherein the component of the data center's physical infrastructure comprises one of: (a) an electrical component or (b) a cooling component.

21. The non-transitory computer-accessible storage medium as recited in claim 18, wherein the particular JCO includes, as a member of the jury, at least one JCS which is classified as being in an inactive state by the particular JCS.

* * * * *